United States Patent [19]
Kondo et al.

[11] Patent Number: 5,726,728
[45] Date of Patent: Mar. 10, 1998

[54] LIQUID CRYSTAL DISPLAY DEVICE AND A PRODUCTION METHOD UTILIZING SURFACE FREE ENERGIES FOR THE SAME

[75] Inventors: Masahiko Kondo, Kitakatsuragi-gun; Nobuaki Yamada, Higashiosaka; Wataru Horie, Hashimoto; Makoto Shiomi; Masayuki Okamoto, both of Tenri; Shuichi Kozaki; Tokihiko Shinomiya, both of Nara; Kohichi Fujimori, Nabari, all of Japan

[73] Assignee: Sharp Kabushiki Kaisha, Osaka, Japan

[21] Appl. No.: 312,623

[22] Filed: Sep. 27, 1994

[30] Foreign Application Priority Data

Sep. 28, 1993 [JP] Japan ................... 5-241704
Jul. 28, 1994 [JP] Japan ................... 6-177075

[51] Int. Cl.$^6$ ................................ G02F 1/1339
[52] U.S. Cl. ................................ 349/156; 349/122
[58] Field of Search ................ 359/81, 51, 52, 359/49, 74; 349/156, 122

[56] References Cited

U.S. PATENT DOCUMENTS

| | | | |
|---|---|---|---|
| 4,579,423 | 4/1986 | Fergason | 350/374 |
| 4,671,618 | 6/1987 | Wu et al. | 350/347 |
| 4,815,826 | 3/1989 | Fergason | 350/339 |
| 4,890,902 | 1/1990 | Doane et al. | 350/347 |
| 5,089,904 | 2/1992 | Fergason | 359/52 |
| 5,096,282 | 3/1992 | Margerum et al. | 359/51 |
| 5,103,326 | 4/1992 | Fergason | 359/31 |
| 5,333,074 | 7/1994 | Hikmet | 359/51 |
| 5,473,450 | 12/1995 | Yamada et al. | 359/51 |

FOREIGN PATENT DOCUMENTS

| | | | |
|---|---|---|---|
| 0278721 | 8/1988 | European Pat. Off. | 359/51 |
| 0497619 | 8/1992 | European Pat. Off. | |
| 0568355 | 11/1993 | European Pat. Off. | |
| 1-269922 | 10/1989 | Japan | |
| 2-99920 | 4/1990 | Japan | |
| 2-153318 | 6/1990 | Japan | |
| 2-153319 | 6/1990 | Japan | |
| 3-61925 | 3/1991 | Japan | |
| 3-278024 | 12/1991 | Japan | |
| 4-31823 | 2/1992 | Japan | |
| 4-31824 | 2/1992 | Japan | |
| 4-212928 | 8/1992 | Japan | |
| 4-338923 | 11/1992 | Japan | |
| 5-11237 | 1/1993 | Japan | |
| 5-27242 | 2/1993 | Japan | |
| 651310 | 2/1994 | Japan | 359/81 |
| 667182 | 3/1994 | Japan | 359/81 |
| 667185 | 3/1994 | Japan | 359/75 |
| 6160824 | 6/1994 | Japan | |

*Primary Examiner*—William L. Sikes
*Assistant Examiner*—James A. Dudek
*Attorney, Agent, or Firm*—Nixon & Vanderhye, P.C.

[57] ABSTRACT

The present invention provides a liquid crystal display device including a pair of substrates, at least one of which bears plural areas formed by using a uniform arrangement of surface free energy; a polymeric wall made of a polymeric material formed by polymerizing a polymerizable material, sandwiched between the substrates and formed in part of the plural areas having a first surface free energy; and a plurality of liquid crystal regions made of a liquid crystal material substantially surrounded by the polymeric wall, sandwiched between the substrates, and formed in another part of the plural areas having a second surface free energy. In this liquid crystal display device, positions of the areas having the first surface free energy, the areas having the second surface free energy, the polymeric wall and the liquid crystal region are determined so that the first surface free energy $\gamma_P$, the second surface free energy $\gamma_E$, surface free energy $\gamma_{LC}$ of the liquid crystal material and surface free energy $\gamma_M$ of the polymeric material satisfy the following relationship:

$$(\gamma_E - \gamma_P) \times (\gamma_{LC} - \gamma_M) > 0$$

42 Claims, 15 Drawing Sheets

EXAMPLE 1A

EXAMPLE 1B

COMPARATIVE EXAMPLE 1

COMPARATIVE EXAMPLE 2

(POWER OFF)

(POWER ON)

FIG. 24A
(POWER OFF)
FIG. 24B
(POWER ON)
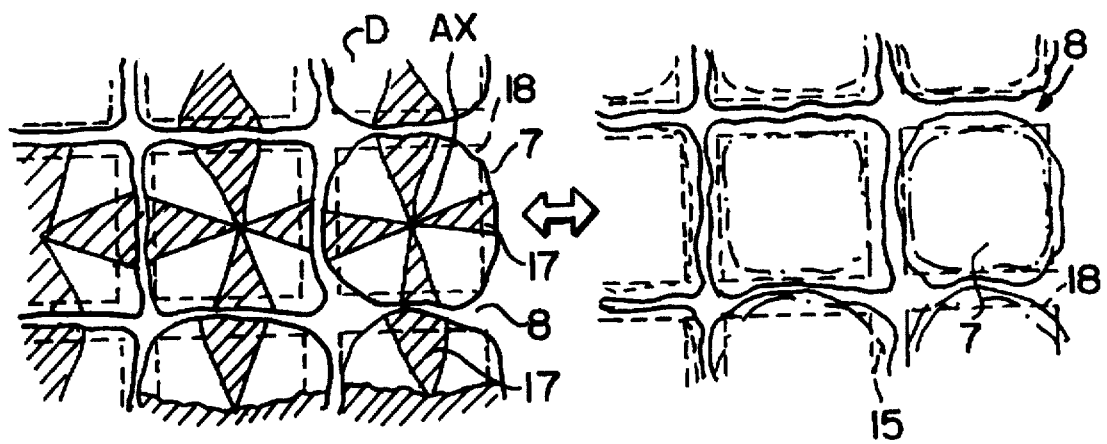
FIG. 25
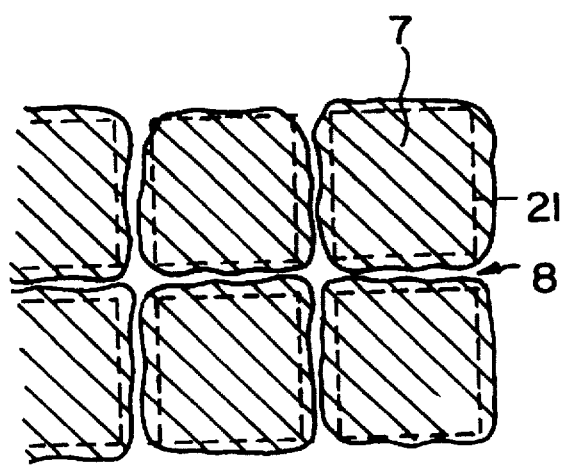

LIQUID CRYSTAL DISPLAY DEVICE AND A PRODUCTION METHOD UTILIZING SURFACE FREE ENERGIES FOR THE SAME

BACKGROUND OF THE INVENTION

1. Field of the Invention

The present invention relates to a liquid crystal display device and a method for producing the same. More particularly, the present invention relates to a liquid crystal display device in which liquid crystal regions are surrounded by polymeric walls and a method for producing the same.

2. Description of the Related Art

Conventional liquid crystal display devices utilize a variety of display modes as follows: As liquid crystal display devices utilizing an electro-optic effect, a twisted nematic (TN) liquid crystal display device and a super-twisted nematic (STN) liquid crystal display using nematic liquid crystal have been put into practical use; and a liquid crystal display device utilizing a ferroelectric liquid crystal has been proposed. Such liquid crystal display devices require to be provided with a polarizing plate and to undergo an alignment treatment. Other liquid crystal display devices requiring no polarizing plate, which utilize a dynamic scattering (DS) effect and a phase change (PC) effect have also been proposed. The cell therein has no polymeric wall in the display region.

Recently, as a liquid crystal display device requiring neither a polarizing plate nor an alignment treatment, a display device utilizing the birefringence of liquid crystal so as to electrically control the transparent state and the opaque state has been proposed. Such a liquid crystal display device, which is designated as a polymer dispersed liquid crystal display device, includes a pair of substrates sandwiching a display medium including liquid Crystal droplets dispersed in a polymeric material. In the polymer dispersed liquid crystal display device, the liquid crystal molecules are uniformly oriented under the application of a voltage. As a result, the refractive index of the liquid crystal molecule with respect to ordinary light is matched with the refractive index of the polymeric material, which is a supporting medium, thereby displaying the transparent state. When no voltage is applied, the liquid crystal molecules are not oriented and cause light scattering, thereby displaying the opaque state.

An example of the production method for such a liquid crystal display device includes a method in which a liquid crystal is contained in a polymeric capsule disclosed in Japanese National Publication No. 58-501631. Another example is disclosed in Japanese National Publication No. 61-502128, in which a liquid crystal material is mixed with a polymeric material including a photopolymerizable material or a thermosetting material, and the polymeric material in the obtained mixture is polymerized so as to deposit the liquid crystal material. Thus, liquid crystal droplets are formed in the polymeric material. The liquid crystal display devices produced by these conventional methods use a display mode in which the transparent/opaque states are electrically controlled.

As a display device utilizing a polarizing plate with an improved viewing angle, Japanese Laid-Open Open Patent Publication Nos. 4-338923 and 4-212928 disclose a liquid crystal display device including the above-mentioned polymer dispersed liquid crystal sandwiched between a pair of polarizing plates disposed so that the respective polarizing directions thereof cross at a right angle. Such a display device has largely improved viewing angle characteristics, although the brightness thereof is disadvantageously a half as low as that of a TN liquid crystal display device because the polarization is eliminated by the scattering of light. The contrast decrease due to the light scattering caused on the interface between the liquid crystal material and the polymeric material can be solved under the following condition: To minimize the interface between the liquid crystal material end the polymeric material in a pixel; and to control the position and the size of a liquid crystal region so as to make one pixel include at least one liquid crystal region. Under the present conditions, however, a liquid crystal region is formed by passively curing the polymerizable material or by using irradiating light with intensity distribution. Therefore, the polymeric material enters a pixel due to light leakage, resulting in preventing the accurate control of the position and the size of the liquid crystal region.

Furthermore, Japanese Laid-Open Patent Publication No. 5-27242 discloses a method for improving the viewing angle by disturbing the orientation of liquid crystal molecules with walls or projections of a polymeric material so as to form random domains. According to this method, however, the domains are formed at random and the polymeric material enters a pixel. Moreover, a disclination line between the liquid crystal regions is formed at random and is not eliminated even under the application of a voltage. As a result, the liquid crystal display device produced by this conventional method has low contrast. Specifically, the light transmittance under application of no voltage and the black level under application of a voltage are disadvantageously low.

Conventionally, a liquid crystal display device is produced by using a mixture of liquid crystal material and a polymerizable material (prepolymer, resin material) in a single phase. For example, a liquid crystal display device utilizing light scattering, which is completely different from a liquid crystal display device disclosed herein, is produced by this method. According to this method, the prepolymer component is removed as a polymer through chemical polymerization, thereby depositing liquid crystal material basically at random. Further polymerization changes the residual prepolymer component into the polymer, resulting in the liquid crystal region being surrounded. Alternatively, a network of the polymer is formed in the liquid crystal material. Although the position and the form of the liquid crystal region and the polymer region depend upon the rate of the polymerization, the dependence is not sufficient for the above-mentioned accurate control for the following reason: A core from which the deposit of the liquid crystal material starts is positioned at random. The liquid crystal phase starts growing from the random core, and a liquid crystal region is formed while the position of the core is retained. Since the position of the core is at random, it is impossible to control the position of the liquid crystal region to be formed. Furthermore, it is necessary to form an independent liquid crystal region with a size as large as or a half as large as a pixel, in order to prevent light scattering in a display region. When the size of the liquid crystal region is controlled by the polymerization rate, the polymerization rate is required to be low in order to form a large liquid crystal region. In order to use a low polymerization rate, it is necessary to accurately control various factors to determine the reaction rate of the mixture such as the temperature of a substrate, the reaction heat, the mixed ratio and purity of materials and the like. Therefore, production becomes extremely complicated.

In the above-mentioned polymer dispersed liquid crystal display device utilizing a mixture of a polymeric material and liquid crystal material, due to the production method, it is unavoidable that the respective liquid crystal regions have different shapes, and it is difficult to control the positions of the liquid crystal regions in the direction along the surface of the substrate. Moreover, since the positions of the liquid crystal regions cannot be accurately controlled, the respective liquid crystal regions have different driving voltages, resulting in a loss of the sharpness in the change of the characteristics regarding the threshold value in the electro-optic characteristics and so relatively raising the driving voltage. As a result, the display quality is disadvantageously degraded.

Further, it is difficult to use such a liquid crystal display device for a refined wide scope since the liquid crystal regions have different shapes and it is difficult to accurately control the positions of the liquid crystal regions in the direction along the surface of the substrate as described above. In addition, for the same reason, when the liquid crystal display device is driven by a duty drive system using an average signal level obtained by turning on/off a signal, a threshold voltage for driving the display device is fluctuated. Therefore, the sharpness in the change of the electro-optic characteristics is decreased, resulting in a difficulty in making the duty ratio large.

In view of these conventional liquid crystal display devices having the above-mentioned problems, the present inventors have realized the following liquid crystal display device having a novel display mode: In one of the liquid crystal display devices, liquid crystal material and a polymeric material are more definitely divided so as to place the liquid crystal material in a pixel and the polymeric material in a non-pixel portion. The polymeric material is made into the shape of a wall to connect a pair of substrates opposing each other. Therefore, the wall formed of the polymeric material works as a kind of a spacer, thereby improving the shock resistance of the resultant liquid crystal display device. The present inventors have proposed two methods for producing this liquid crystal display device.

One of the methods is disclosed in Japanese Patent Application No. 5-30996. According to this method, a mixture of a liquid crystal material, a photopolymerizable material and a photopolymerization initiator is injected between a pair of opposing substrates. Then, a photomask is placed on one of the substrates so as to shield pixels, and the mixture is irradiated with UV rays through the photomask. Thus, liquid crystal material is collected in the pixels, that is, in the weakly irradiated areas, and the polymeric material is collected in the non-pixel portions, that is, in the strongly irradiated areas. In this manner, a liquid crystal display device having a display medium including the liquid crystal regions and the polymeric walls is produced. In this method, since the pixels are shielded by the photomask, the liquid crystal regions can be formed in the pixels as desired.

The other method is disclosed in Japanese Patent Application No. 6-25485. This method adopts a self-alignment method using an ITO (indium and tin oxides) electrode as a photomask. According to this method, the ITO electrode, which has a characteristic of absorbing UV rays, is used as a photomask, and a strongly Irradiated area and a weakly irradiated area are formed due to the difference in the UV-ray transmittance between the area shielded by the ITO electrode and the area not shielded by the ITO electrode. Thus, liquid crystal material is collected in pixels.

The present inventors have made studies to attain complete phase-separation without leaving a polymeric material in a pixel, i.e., to attain complete independence of the liquid crystal region from a polymeric region (polymeric wall). It is difficult to completely separate the liquid crystal material and the polymeric material because the polymeric material occasionally remains in the liquid crystal region, or the liquid crystal material occasionally remaining in the polymeric wall. In the former case, the polymeric material remained in the liquid crystal region decreases the aperture ratio of the liquid crystal device. Further, since the polymeric material remains on an alignment film, the quality of the alignment state is degraded, thereby degrading the optical characteristics of the liquid crystal material, for example, decreasing the response rate and the contrast. In the latter case, light is scattered in the non-pixel portions, and the mechanical strength of the polymeric wall is decreased, thereby possibly degrading the shock resistance of the liquid crystal device. In this manner, insufficient separation of the liquid crystal material and the polymeric material causes various problems.

In the production method disclosed in the above-mentioned Japanese Laid-Open Patent Publication NO. 4-212928, since the liquid crystal region is formed by using the phase-separation, it is difficult to accurately control the size and the planar position of the liquid crystal region.

A conventional liquid crystal display device using a polarizing plate is not suitable for wide viewing because of its poor viewing angle characteristics. For example, a TN liquid crystal display device has a structure as shown in FIGS. 7A through 7C. As shown in FIG. 7A, liquid crystal 9 is sandwiched between substrates 1 and 2 so as to have an initial orientation of 90° twist and rise in one direction at a certain angle (i.e., a pretilt angle). When a voltage is applied by a DC power supply 11, before the liquid crystal molecules 10 rise in the same direction to be parallel to the normal lines of the substrates 1 and 2 as shown in FIG. 7C, the liquid crystal molecules 10 tilt in the same direction as shown in FIG. 7B. Therefore, the apparent refractive index is different when seen from the directions of an arrow A and an arrow B. As a result, the contrast of the display is largely different when seen from the directions of the arrows A and B, and an abnormal display such as the reversal of black and white colors can possibly be caused. In this manner, the conventional display mode has a problem of poor viewing angle characteristics.

Recently, the present inventors have proposed, in Japanese Patent Application No. 5-78378, a liquid crystal display device in which liquid crystal material and a photopolymerizable material is regularly phase-separated by irradiating the mixture of the liquid crystal material and the photopolymerizable material in a liquid crystal cell with UV rays having a uniform (regular) intensity distribution. The liquid crystal display device has extremely improved viewing angle characteristics because of axisymmetrically oriented liquid crystal domains or liquid crystal molecules.

In this liquid crystal display device, as shown in FIG. 8A, a liquid crystal region 7 surrounded by polymeric walls 8 between substrates 1 and 2 is formed in each pixel. Thin films 13 and 14 are respectively formed between the liquid crystal region 7 and the substrates 1 and 2. The liquid crystal region 7 includes a plurality of liquid crystal domains 12, and each domain 12 includes liquid crystal molecules 10 having an initial orientation of 90° twist and rising in one direction at a certain angle (i.e., a pretilt angle). Before the liquid crystal molecules 10 rise in the direction to be parallel to the normal lines of the substrates 1 and 2 under the application of a voltage by a power supply 11 as shown in FIG. 8C, the liquid crystal molecules 10 tilt so as to have a directional component vertical to the substrates 1 and 2 due to the interaction between the liquid crystal molecules 10 and the polymeric wall 8. Therefore, the apparent refractive index is approximately the same when seen from the directions A and B. Thus, the viewing angle characteristics of this liquid crystal display device are largely improved.

In order to orient the liquid crystal molecules 10 in an axisymmetrical manner, which is the most effective orientation for improving the viewing angle characteristics, a polymeric wall or pillar is required in the center of the pixel. Such a polymer wall or pillar, however, decreases the size of the liquid crystal region 7, thereby decreasing the light transmittance under the application of no voltage. Further, a disclination line 15 between the liquid crystal domains 12 can neither be controlled nor eliminated even under application of a voltage, thereby decreasing the contrast.

Furthermore, as shown in FIG. 9, between the liquid crystal region 7 and the substrate 1 or 2 exists an area 8a where the liquid crystal 7 and the polymeric material 8 are mixedly present. The liquid crystal molecules in the area 8a do not respond to an external electric field. Therefore, even when a voltage applied between electrodes 3 and 4 on the substrates 1 and 2 is saturated, light leakage is caused due to the birefringence of the liquid crystal molecules in the area 8a, thereby decreasing the contrast of the liquid crystal display device.

Moreover, since the liquid crystal material and the polymeric material is separated by UV-ray irradiation through a mask, a UV-ray irradiation apparatus having a collimated light source is required to maintain accuracy in forming a pattern, thereby increasing the production cost.

Thus, a method for definite phase-separation between liquid crystal material and a polymeric material has been seriously required.

SUMMARY OF THE INVENTION

The liquid crystal display device of this invention comprises a pair of substrates, at least one of which bears plural areas formed by using a uniform pattern of arrangement of surface free energy; a polymeric wall made of a polymeric material formed by polymerizing a polymerizable material, sandwiched between the substrates and formed in part of the plural areas having a first surface free energy; and a plurality of liquid crystal regions made of a liquid crystal material substantially surrounded by the polymeric wall, sandwiched between the substrates, and formed in another part of the plural areas having a second surface free energy. In this liquid crystal display device, positions of the areas having the first surface free energy, the areas having the second surface free energy, the polymeric wall and the liquid crystal region are determined so that the first surface free energy $\gamma_P$, the second surface free energy $\gamma_E$, surface free energy $\gamma_{LC}$ of the liquid crystal material and surface free energy $\gamma_M$ of the polymeric material satisfy the following relationship:

$$(\gamma_E - \gamma_P) \times (\gamma_{LC} - \gamma_M) > 0$$

When this relationship is satisfied, the second surface free energy $\gamma_E$ is larger than the first surface free energy $\gamma_P$ and the surface free energy $\gamma_{LC}$ of the liquid crystal material is larger than the surface free energy $\gamma_M$ of the polymeric material. Alternatively, the second surface free energy $\gamma_E$ is smaller than the first surface free energy $\gamma_P$ and the surface free energy $\gamma_{LC}$ of the liquid crystal material is smaller than the surface free energy $\gamma_M$ of the polymeric material. In either of the above cases, the liquid crystal region is formed in part of the plural areas having one surface free energy, and the polymeric wall is formed in part of the plural areas having the other surface free energy. Thus, the liquid crystal material is definitely phase-separated from the polymeric material.

In one embodiment, the first surface free energy is smaller than the second free energy.

In another embodiment, a gap $d_1$ between the substrates in a pixel is larger than a gap $d_2$ between the substrates in at least part of a non-pixel portion.

In this embodiment, the surface free energy of the area having the gap $d_1$, the surface free energy of the area having the gap $d_2$, and the surface free energy of the liquid crystal material and the polymeric material can satisfy the above-mentioned relationship. Therefore, the liquid crystal material is definitely phase-separated from the polymeric material.

In still another embodiment, the gaps $d_1$ and $d_2$ are determined so as to satisfy the following relationship:

$$0.1 \times d_1 < d_2 < 0.9 \times d_1$$

Also in this case, the liquid crystal material is phase-separated from the polymeric material.

In still another embodiment, the liquid crystal display device is an active matrix display device, and one of the substrates having an active element has a light shielded area in the non-pixel portion, and the other substrate has an area partially transmitting UV rays in at least part of the non-pixel portion.

In this embodiment, the phase-separation between the liquid crystal material and the polymeric material can be caused by UV-ray irradiation in addition to the above-mentioned manner using the difference in the cell gaps.

Alternatively, the liquid crystal display device of this invention comprises a pair of substrates opposing each other; a display medium sandwiched between the substrates and including a polymeric wall and a plurality of liquid crystal regions surrounded by the polymeric wall; and a thin film formed in at least part of a non-pixel portion on a surface bearing the display medium of at least one of the substrates. The thin film is formed so as to make surface free energy of the non-pixel portion smaller than surface free energy of e pixel.

In this embodiment, the thin film is formed so as to provide the uniform pattern of arrangement of the surface free energy, thereby causing phase-separation between the liquid crystal material and the polymeric material.

In one embodiment, each of at least 70% of the pixels has at least one of the liquid crystal regions having a size of 30% or more of that of the pixel.

In this embodiment, the aperture ratio of the liquid crystal display device can be increased, thereby increasing the clearness of a displayed image.

In another embodiment, the surface free energy of the non-pixel portion is 75 mN/m or less.

In still another embodiment, a difference in the surface free energy between the non-pixel portion and the pixel is 15 mN/m or more.

Alternatively, in the method for producing a liquid crystal display device of this invention, the liquid crystal display device includes a pair of substrates at least one of which is transparent and a complex film sandwiched between the substrates and having a space structure including liquid crystal material and a polymeric material. In this method, free energy of a system constituting the liquid crystal display device is spatially controlled for controlling the space structure during the production of the liquid crystal display device.

In one embodiment, interfacial free energy between at least one of the substrates facing the complex film and at least one component of the complex film is controlled for spatially controlling the free energy of the system.

In this embodiment, the component of the complex film can be collected in a desired area previously formed so as to have predetermined surface free energy, resulting in definite phase-separation between the liquid crystal material and the polymeric material.

In another embodiment, a photosensitive resin is used for controlling the interfacial free energy.

In this embodiment, the phase-separation between the liquid crystal material and the polymeric material can be conducted definitely, thereby forming the liquid crystal region and the polymeric wall with high accuracy.

In still another embodiment, a surface of the substrates is reformed for controlling the interfacial free energy.

In still another embodiment, a distance between the substrates is controlled so that a surface area of a phase-separated interface between components of the complex film in a controlled regular state is smaller than the surface area of the phase-separated interface between components of the complex film in an irregular state, thereby controlling interfacial free energy on the phase-separated interface for spatially controlling the free energy of the system.

In this embodiment, as the phase-separation proceeds, the components of the complex film in the irregular state moves into the controlled regular state, thereby gradually decreasing the surface area of the interface between the components. Therefore, the liquid crystal material is definitely phase-separated from the polymeric material.

Alternatively, in the method for producing a liquid crystal display device of this invention, a mixture including at least liquid crystal material and a photopolymerizable material is injected between a pair of substrates, irradiated with UV rays so as to cause phase-separation accompanied with a polymerization reaction, thereby regularly arranging a polymeric material and the liquid crystal material. In this method, at least one of the substrates has a plurality of areas formed by using a regular surface free energy arrangement so that surface free energy of areas having smaller surface free energy is 75 mN/m or less.

In this embodiment, the phase-separation is caused not only by spatially controlling the surface free energy but also by the UV-ray irradiation. Therefore, the liquid crystal material is more definitely separated from the polymeric material.

Alternatively, in the method for producing a liquid crystal display device of this invention, a mixture including at least liquid crystal material and a photopolymerizable material is injected between a pair of substrates and irradiated with UV rays so as to cause phase-separation accompanied with a polymerization reaction, thereby regularly arranging a polymeric material and the liquid crystal material. In this method, at least one of the substrates has a plurality of areas formed by using surface free energy arrangement having a difference in surface free energy of at least 15 mN/m.

The method for producing a liquid crystal display device having a pair of substrates opposing each other and a display medium sandwiched between the substrates and including a plurality of liquid crystal regions surrounded by a polymeric wall of this invention comprises the steps of forming a thin film on at least part of a non-pixel portion of at least one of the substrates; attaching the substrates to each other so as to have the thin film on an inner surface and have a gap therebetween; injecting a mixture including at least liquid crystal material, a photopolymerizable material and a polymerization initiator into the gap; and irradiating the mixture with UV rays so as to the display medium including the liquid crystal regions surrounded by the polymeric wall.

In this embodiment, the surface free energy of the substrate or the cell gap between the substrates can be controlled by the thin film formed on at least one of the substrates in a desired patterned manner. Therefore, the phase-separation can be caused not only by the control of the surface free energy but also by the UV-ray irradiation, thereby definitely phase-separating the liquid crystal material from the polymeric material.

In one embodiment, a portion of the mixture corresponding to a pixel is covered with a photomask in the step of irradiating the mixture with UV rays so that irradiation intensity on the portion covered with the photomask becomes 80% or less of intensity of irradiating UV rays.

In another embodiment, the step for forming the display medium includes phase-separation between the liquid crystal material and a polymeric material is conducted while applying at least one of a voltage and a magnetic field.

When a voltage or a magnetic field is applied to the mixture, the director of a liquid crystal molecule is aligned in the direction of the voltage or the magnetic field during the phase-separation between the liquid crystal material and the polymeric material.

In still another embodiment, the photopolymerizable material includes a polymerizable liquid crystal material.

In this embodiment, the phase-separation between the liquid crystal material and the polymeric material can be conducted more precisely.

In still another embodiment, surface free energy of the photopolymerizable material is 40 mN/m or less.

Also in this embodiment, the phase-separation is caused by the control of the surface free energy.

In another embodiment, a liquid crystal cell fabricated by injecting the mixture including the liquid crystal material and the photopolymerizable material between the substrates is annealed from a temperature over an isotropic temperature $T_{iso}$ of the liquid crystal material and the photopolymerizable material down to a temperature below the isotropic temperature $T_{iso}$.

In this embodiment, the liquid crystal material is deposited from the mixture. After the deposit of the liquid crystal material, the photopolymerizable material is polymerized. Thus, the phase-separation between the liquid crystal material and the photopolymerizable material is conducted using the deposited liquid crystal material as a core.

Alternatively, in the method for producing a liquid crystal display device of this invention, a mixture including at least liquid crystal material and a thermopolymerizable material is injected between a pair of substrates and heated so as to cause phase-separation accompanied with a polymerization reaction, thereby regularly arranging a polymeric material and the liquid crystal material. In this method, at least one of the substrates has a plurality of areas formed by using surface free energy arrangement so that surface free energy of an area having a lower surface free energy is 75 mN/m or less.

Alternatively, in the method for producing a liquid crystal display device of this invention, a mixture including at least liquid crystal material and a thermopolymerizable material is injected between a pair of substrates and heated so as to cause phase-separation accompanied with a polymerization reaction, thereby regularly arranging a polymeric material and the liquid crystal material. In this method, at least one of the substrates has a plurality of areas formed by using surface free energy arrangement with a difference in surface free energy of 15 mN/m or more.

In this manner, the phase-separation between the liquid crystal material and the polymeric material can be performed more definitely by heating the mixture in addition to the control of the surface free energy.

In one embodiment, the step for forming the display medium includes phase-separation between the liquid crystal material and a polymeric material is conducted whale applying at least one of a voltage and a magnetic field.

In another embodiment, the thermopolymerizable material includes a polymerizable liquid crystal material.

In still another embodiment, surface free energy of the thermopolymerizable material is 40 mN/m or less.

In still another embodiment, a liquid crystal cell fabricated by injecting the mixture including the liquid crystal material and The thermopolymerizable material between the substrates is annealed from a temperature over an isotropic temperature $T_{iso}$ of the liquid crystal material and the thermopolymerizable material down to a temperature below the isotropic temperature $T_{iso}$.

Alternatively, in the method for producing a liquid crystal display device including a pair of substrates bearing electrodes, at least one of which is transparent, and a complex film including liquid crystal material and a polymeric material sandwiched between the substrates of this invention, an interface between one of the substrates and the complex film is selectively reformed.

In this case, the intersurfacial free energy of the interface between the substrate and the complex film can be controlled by the selective reform, thereby definitely phase-separating the liquid crystal material from the polymeric material.

In one embodiment, an alignment film is formed on the interface between one of the substrates and the complex film.

In another embodiment, the alignment film is subjected to a rubbing treatment so that a surface of the alignment film is selectively reformed by using a difference in rubbing intensity due to a level difference caused by the electrodes.

In this embodiment, the phase-separation by the control of the surface free energy can be conducted more definitely by the selective variation of the rubbing intensity.

In still another embodiment, a coat is formed in a specified area on the alignment film.

In still another embodiment, the method comprises the steps of forming an alignment film on the substrates bearing the electrodes; forming a coat in a specified area on the alignment film; and subjecting the alignment film and the coat to a rubbing treatment.

Thus, the invention described herein makes possible the advantages of (1) providing a liquid crystal display device in which liquid crystal material and a polymeric material is definitely separated and the position and the size of a liquid crystal region is well controlled so as to attain high contrast and remarkably improve the viewing angle characteristics as well as suppressing the change in the display characteristics caused by external pressure on the liquid crystal display device; and (2) providing a simplified production method for a liquid crystal display device in which positioning can be accurately controlled.

These and other advantages of the present invention will become apparent to those skilled in the art upon reading and understanding the following detailed description with reference to the accompanying figures.

BRIEF DESCRIPTION OF THE DRAWINGS

FIG. 3 is a plan view of electrodes in the liquid crystal display device of Example 1a.

FIGS. 24A and 24B are plan views of pixels produced in Example 4 observed through a polarizing microscope.

FIG. 25 is a plan view of a liquid crystal display device produced in Example 18 observed through a polarizing microscope.

DESCRIPTION OF THE PREFERRED EMBODIMENTS

Figure 1:
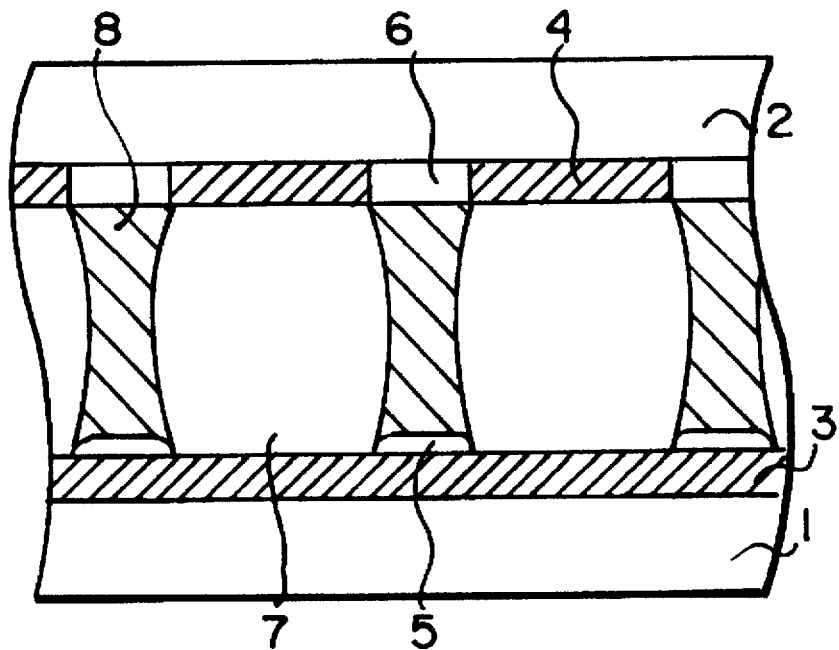
FIG. 1 is a sectional view of a liquid crystal display device according to Examples 1 and 1a of the present invention.

The outline of the present invention will be described first.

In a liquid crystal display device including a liquid crystal region surrounded by polymeric walls, to attain sufficiently high contrast, it is necessary to make the interface between the liquid crystal region and the polymeric wall as small as possible and to place at least one liquid crystal region in one pixel. Therefore, control of the position and the shape of the liquid crystal region is required. Particularly, in order to prevent the contrast of the display from being decreased by light scattering on the interface, it is preferable that each of at least 70% of pixels has at least one liquid crystal region with a size of at least 30% of that of the pixel.

Such a liquid crystal region surrounded by the polymeric walls can be obtained by injecting a mixture including a photopolymerizable material and a liquid crystal material into a gap between a pair of substrates (i.e., a cell) and causing photopolymerization of the photopolymerizable material for phase-separation between the liquid crystal material and the polymeric material. In order to control the position where the photopolymerization occurs, the following methods for forming areas where the liquid crystal material and the photopolymerizable material tend to be respectively positioned can be adopted.

(1) To form areas where the photopolymerizable material tends to be collected: For example, on non-pixel portions on at least one of the opposing substrates is formed a thin film with a material having high wettability against the photopolymerizable material. Due to this thin film, the photopolymerizable material can be collected onto the non-pixel portions with ease, and the photopolymerization can be effected in the non-pixel portions. In this case, it is preferable that the relationship of (the surface free energy of the photopolymerizable material)<(the surface free energy of the thin film)<(the surface free energy of the liquid crystal material) is satisfied. When the surface free energy thereof satisfies this relationship, the liquid crystal region can be formed at the desired position.

(2) To form areas where the liquid crystal material tends to be collected: For example, on pixels of at least one of the substrates is formed a thin film with a material having high wettability against the liquid crystal material. Due to this film, the liquid crystal material can be collected on the pixels.

(3) To form areas where the photopolymerizable material and the liquid crystal material respectively tend to be collected: For example, a thin film is formed on pixels of at least one of the substrates with a material having high wettability against the liquid crystal material and another thin film is formed on non-pixel portions with a material that having high wettability against the photopolymerizable material. Due to these films, the liquid crystal region can be formed on a pixel with ease, and the polymeric wall can be formed in a non-pixel portion with ease. As a result, the liquid crystal region and the polymeric wall are definitely separated.

Among the above-mentioned methods (1) through (3), method (2), in which a thin film having high wettability against the liquid crystal material than in indium and tin oxides (ITO), is formed on the substrate, is not very practical except for a case where a metal film is formed. Therefore, method (1), in which a thin film having high wettability against the photopolymerizable material is formed on the substrate, is more suitable except for a case using for a reflection type display. Since an ordinary pixel has an electrode made of indium and tin oxides (ITO), the surface free energy of the thin film formed in method (1) is preferably smaller than the surface free energy of ITO. Further, in order to make a large difference in the surface free energy between the pixel (ITO) and the non-pixel portion, the surface free energy of the thin film is preferably 40 mN/m or less.

Alternatively, it is possible to collect the liquid crystal material and the photopolymerizable material in desired positions by using irradiation intensity distribution. In conducting UV-ray irradiation, a photomask is provided so as to shield portions of the mixture corresponding to the pixels, and make the irradiation intensity against the shielded portions 80% or less of that against the other portions. In the strongly irradiated portions, the photopolymerization rate is high, and the rate of the phase-separation between the liquid crystal material and the photopolymerizable material is also high. Therefore, in such areas, the polymeric walls are formed quickly. In the weakly irradiated portions, the photopolymerization rate is low. Therefore, the liquid crystal material is pushed aside onto the pixels, thereby forming the liquid crystal regions on the pixels. Thus, a photomask can make the phase-separation more definite.

In addition, when polarizing plates are provided on the outside surfaces of the substrates, the produced liquid crystal display device works similarly as a conventional TN, STN, FLC (SSF) or ECB liquid crystal display device.

The present inventors have found a novel method for forming a polymeric wall in a patterned manner in view of the difference in the affinity of a polymeric material and liquid crystal material with areas having different surface free energy or different cell gaps on a substrate. Further, the present inventors have found that contrast is improved in a liquid crystal display cell in which a liquid crystal region is surrounded by polymeric walls, liquid crystal molecules in the liquid crystal region are oriented axisymmetrically (radially), and each pixel includes substantially one liquid crystal domain (i.e., mono-domain).

The outline of the present invention will now be described in more detail.

1. The necessity of the control of a liquid crystal region and a polymeric region (polymeric wall)

In a dot matrix display, respective pixels contributing to the display are regularly aligned so as to form an image as a whole. A liquid crystal display device is generally driven by a simple matrix drive or an active matrix drive to form such an image.

In a liquid crystal display device of this invention, a complex film composed of a display medium including a polymeric material and liquid crystal material is used for the display. The complex film is sandwiched between polarizing plates, thereby controlling the optical activity and the birefringence of a liquid crystal region by an electric field. Thus, the light transmitting state and the light shielding state are obtained. At this point, a polymeric material is optically isotropic and the optical characteristics thereof are not varied by an electric field applied to the display. Therefore, in order to obtain a sufficient contrast ratio, which is an index of clearness of the display and indicated as a ratio of the light transmittance in the light transmitting state and the light shielding state, the polarizing plates attached to substrates are required to be located so that the transmittance axes thereof cross at a right angle. Even when the polarizing plates are thus located, however, the light transmittance becomes irregular or roughness is caused in the display when the sizes of the liquid crystal regions are not sufficiently uniform.

In order to control the irregularity of the light transmittance in each pixel, the number of the liquid crystal regions contained in one pixel is increased so as to prevent the optical characteristics of each liquid crystal region from affecting the characteristics of the pixel. By this method, however, a polymeric wall is unavoidably formed in the pixel, thereby decreasing the light transmittance. To obtain sufficient light transmittance of the entire display device, it is preferable that the liquid crystal regions are collected in a pixel as compared with in the non-pixel portion, and more preferably, each pixel is occupied by a single liquid crystal region.

Therefore, it is significant to sufficiently control the position and the shape of a liquid crystal region in a pixel so as to attain a sufficiently high transmittance and to avoid the roughness in the display.

2. Production of a liquid crystal display device by controlling free energy

In the present invention, control of free energy is proposed as a controlling method for the positions of the liquid crystal region and the polymeric wall in a complex film. Under the control of free energy, a mixture in a single phase is phase-separated so as to collect the separated phases respectively at desired positions in desired shapes. By fixing these phases, the positions and the shapes of the liquid crystal region and the polymeric wall can be controlled as required.

In order to separately form the liquid crystal region and the polymeric wall in the production procedure of the display device, a mixture of liquid crystal material and a polymeric material (prepolymer) in a single phase is phase-separated by gradually decreasing the temperature thereof, and the separated phases are fixed. In the present invention, by utilizing a difference in the physical and chemical characteristics between the separated fluid phases, or by utilizing the characteristics of the interface between the two phases, the positions and the shapes of the two phases are controlled, resulting in controlling the positions and the shapes of the liquid crystal region and the polymeric wall in the complex film to be produced.

This method is more effective in controlling the positions of the liquid crystal region and the polymeric well as compared with the above-mentioned conventional methods. In this method, the variation in the reaction rate of the polymerization depending upon the kind of the prepolymer to be used does not largely affect the positions and the shapes of the liquid crystal region and the polymeric wall.

3. Kinds of controllable free energy

Free energy accurately controllable between the substrates of a liquid crystal display device is suitable for the present invention. Examples of such controllable free energy include interfacial free energy, electric field energy, and magnetic field energy.

4. The mechanism of the control of the phase-separation by controlling the free energy In the present invention, the phases are separated not by the conventional method utilizing the polymerization of a polymerizable material, but by thermal phase-separation accompanied with the control of temperature. Therefore, during the phase-separation, the behavior of the reaction system is thermodynamically described. In the actual production procedure of a liquid crystal display device, it can be assumed that no material is substantially added to or removed from the system and that the heat capacity of a substrate is sufficiently larger than that of a complex film including the liquid crystal material and the polymeric wall. Further, it can be regarded that the time required for a liquid crystal molecule and a prepolymer molecule to move the distance of the size of the display device is sufficiently short as compared with the time scale of the phase-separation so the complex film substantially forms a thermally equilibrated system. The behavior of such a closed and thermally equilibrated system is generally described by using free energy.

Helmholtz's free energy and Gibbs' free energy are generally used to describe the case where volume and pressure of the system are fixed, respectively. The distinction between them is required when it is necessary to consider the work of an external pressure to the free energy dominating the system under the condition of a fixed pressure, not a fixed volume (for example, An the case where a gas is in contact with the system). With regard to the liquid crystal display device under consideration, there is no need to distinguish them for the following reason: The volume condition is approximately fixed because the reaction system is in a space supported by a spacer or the like between the approximately rigid substrates; and the point under consideration is in the phase-separation of a mixture including condensed phases alone such as a liquid phase (an isotropic phase) and a liquid crystal phase.

Now the positions and the shapes of a liquid crystal region and a polymeric wall that are artificially controllable by controlling such free energy will be described.

The production procedure of the liquid crystal display device under consideration includes the following steps: A mixture of liquid crystal material (a liquid crystal phase) and a prepolymer (an isotropic phase) is injected between two substrates at a temperature that allows the mixture to be in the isotropic phase; and then, the mixture is annealed so as to separate the liquid crystal phase from the isotropic phase and the separated phases are fixed. In such a production procedure, during the phase-separation between the liquid crystal phase and the isotropic phase, it is possible to control the free energy against at least one of the phases or the interface therebetween so that the free energy of the entire system relating to the phase-separation can be kept to a minimum when desired positions and shapes of a liquid crystal region and/or a polymeric wall are attained. The position and the shape of the liquid crystal region formed under this control closely approximate the desired ones as compared with those formed without this control.

Further, when the free energy against at least one of the phases or the interface therebetween is spatially and selectively controlled in a patterned manner, the phases are located in accordance with the pattern.

5. Specific control of free energy and the mechanism thereof

The mechanism of control for the liquid crystal region by using a specific controlling method of free energy will now be described.

(1) Phase-separation by controlling interfacial free energy:

A material having different interfacial free energy against the liquid crystal phase and the isotropic phase is previously coated on a substrate. By forming a desired pattern with this material, the liquid crystal phase can be located in accordance with the pattern. Such control can be attained by properly determining, as described below, the relationship among the interfacial free energy of the substrate bearing the material against the liquid crystal phase, the interfacial free energy of the substrate bearing the material against the isotropic phase, the interfacial free energy of the substrate not bearing the material against the liquid crystal phase, and the interfacial free energy of the substrate not bearing the material against the isotropic phase. The thus positioned liquid crystal region is fixed, thereby attaining the desired position and shape of the liquid crystal region. This phase-separation will now be described in detail.

(a) Phase-Separation between liquid crystal material and polymeric material:

In the present invention, a polymerizable material contained in a homogeneous mixture of liquid crystal material and the polymerizable material is polymerized so as to cause the phase-separation between the liquid crystal material and the polymeric material. At this point, two kinds of areas having different surface free energy or a different cell gap are formed in a patterned manner on the substrate. Since the affinity of the polymeric material and the liquid crystal material are different in the respective two areas, the liquid crystal region and the polymeric wall can be separately formed.

Figure 10A:
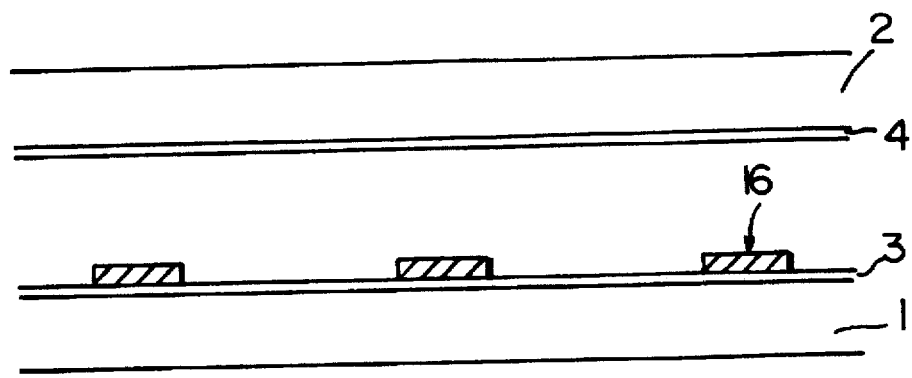
FIGS. 10A and 10B are a sectional view and a plan view of a cell used in the present invention, respectively.
Figure 10B:
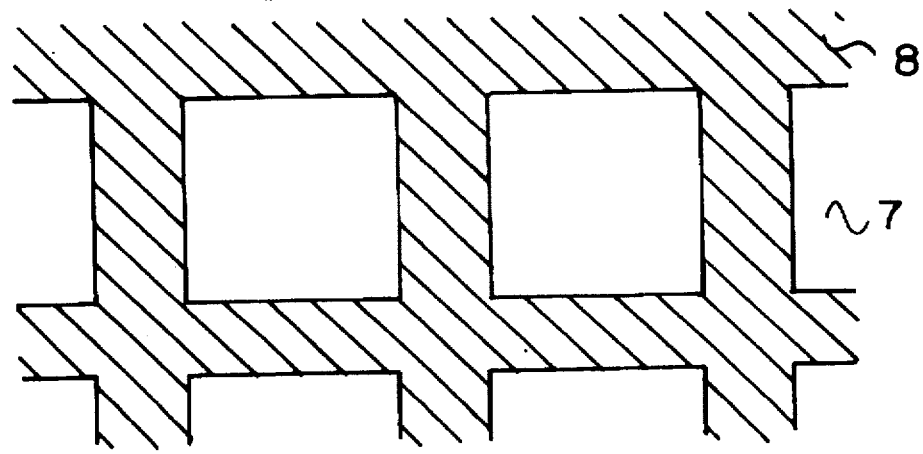

FIGS. 10A and 10B show a typical cell used in the present invention. FIG. 10A is a sectional view of the cell and FIG. 10B is a plan view thereof. The cell of this invention includes a pair of substrates 1 and 2, and electrodes 3 and 4 formed on the surfaces of the substrates 1 and 2 opposing each other. On at least one of the substrates (the substrate 1 in FIG. 10A) are formed projections 16 made of a polymeric material or an inorganic material in areas other than pixels (hereinafter, referred to as the non-pixel portions). The pixel is substantially surrounded by the projections 16. The mixture of liquid crystal material and a polymerizable material injected into the cell is irradiated with UV rays (when the polymerizable material is a UV-ray polymerizable material) or heated (when it is a thermosetting material) so as to polymerize the polymeric material, thereby phase-separating the liquid crystal material from the polymerizable material.

In the present invention, when the polymerization rate is sufficiently lower than the moving rate of the polymeric material, since the surface of the substrate 1 has a higher affinity against the liquid crystal material in some areas, partially phase-separated liquid crystal molecules are collected in such areas with a higher affinity and push aside the polymerizable material. Alternatively, in the substrate having two kinds of cell gaps, since less polymerizable material is required to form a polymeric wall in an area having a smaller cell gap, the polymerizable material is collected in such an area having a smaller cell gap. In this manner, a polymeric wall 8 and a liquid crystal region 7 are separately formed in accordance with the pattern formed on the substrates 1 and 2.

Figure 9:
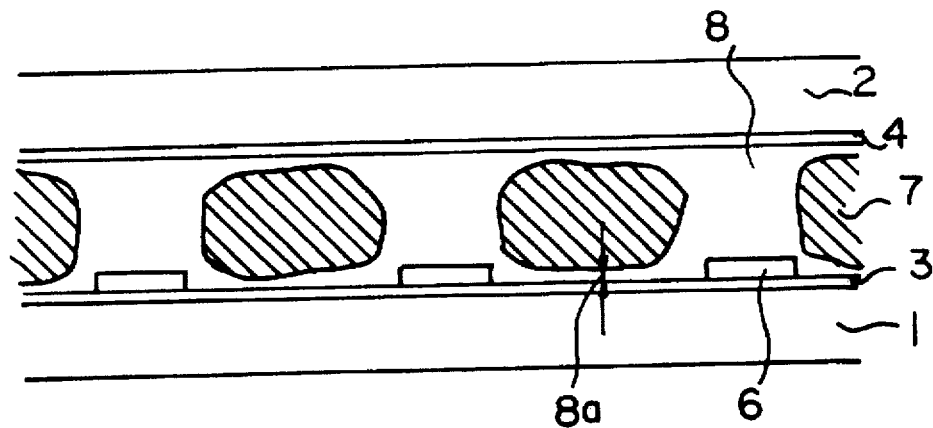
FIG. 9 is a sectional view of an area where a polymeric material is attached to a substrate within a conventional liquid crystal region of a liquid crystal display device.

In this case, since the difference in the surface free energy is used for the phase-separation, an area where the liquid crystal material and the polymeric material are mixedly present between the liquid crystal region and the substrate formed in the conventional method, i.e., the area 8a in FIG. 9, is not formed, and the leakage of birefringent light caused by the liquid crystal molecules trapped in the polymeric wall is prevented at the time of voltage saturation.

By this method, even when the pattern of the areas having different surface free energy is formed only one of the substrates, i.e., when a combination of a patterned substrate and a non-patterned substrate is used, the effect of the present invention can be sufficiently exhibited. Further, when the pattern is formed on both substrates, the effect of the present invention can be also sufficiently exhibited. When the pattern is formed on both substrates, it is not necessary to have the pattern on one substrate coincide with that on the other. For example, for a simple matrix system, an area having a different surface free energy is formed in a striped pattern on each substrate. When the respective substrates are facing to each other so that the stripes cross at a right angle, a liquid crystal device including latticed polymeric walls can be produced.

Figure 11A:
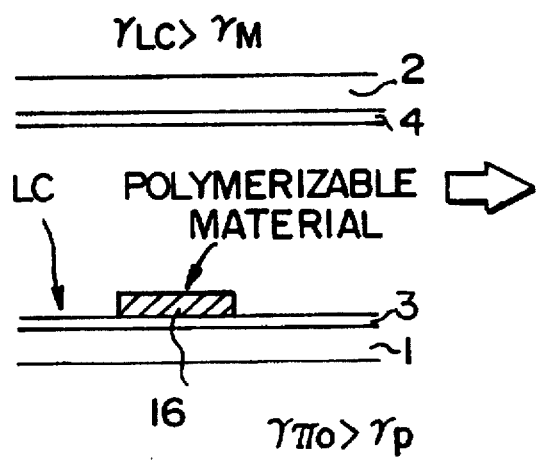
FIG. 11 illustrates an example of the principle of the separation between liquid crystal material and a polymeric material on areas having different surface free energy.
Figure 11B:
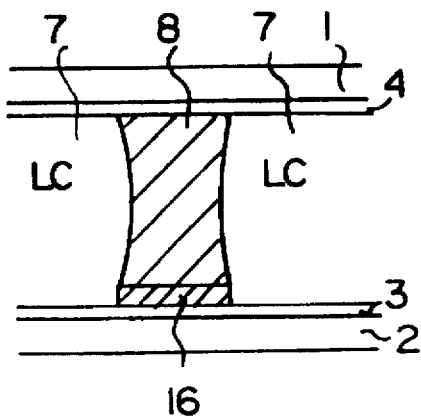

(b) The relationship of the surface free energy:

In the present method, liquid crystal material and a polymeric material are regularly separated by using the difference in the surface free energy. Therefore, the relationship of the surface free energy between the liquid crystal material and The polymeric material and between the substrate and the patterned area thereon is significant.

i) In the case where the surface free energy $\gamma_{LC}$ of the liquid crystal material>the surface free energy $\gamma_M$ of the polymeric material:

In this case, it is possible to form the polymeric wall 8 in a non-pixel portion as shown in (b) of FIG. 11 by allowing at least part of the projections 16 disposed in the non-pixel portions to have a smaller surface free energy as shown in (a) of FIG. 11.

It is preferable to add a polymerizable monomer including a fluorine (F) atom to the polymerizable material because the surface free energy of the polymeric material is thus further decreased, resulting in exhibiting the effect of the present invention more clearly. In this case, since the miscibility between the polymerizable monomer including a F atom and The liquid crystal material is generally low, the liquid crystal material is effectively separated from the liquid crystalline monomer after the phase-separation and the amount of the liquid crystalline monomer material remaining in the polymeric material is decreased. Therefore, the amount of the liquid crystal molecules in the polymeric material existing on the interface between the liquid crystal material and the substrate within the liquid crystal region can be decreased. As a result, the amount of the liquid crystal molecules not responding to an electric field under application of a saturation voltage, which is described with regard to the related art, can be decreased, thereby improving the contrast of the display. Further, when the polymerizable monomer including a F atom is contained therein, the F atoms are unevenly distributed on the interface between the liquid crystal material and the polymeric material. As a result, the anchoring intensity between the liquid crystal material and the polymeric material is decreased, thereby decreasing the driving voltage.

Figure 12A:
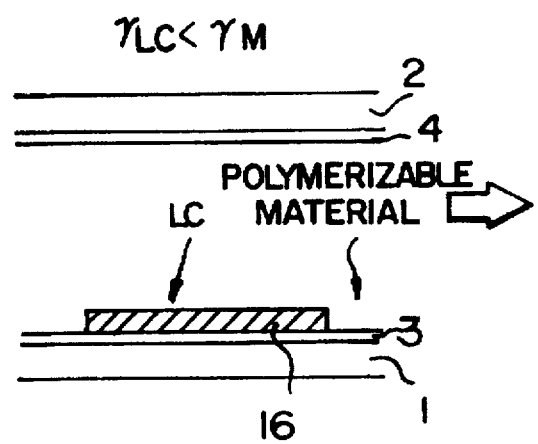
FIG. 12 illustrates another example of the principle of the separation between liquid crystal material and a polymeric material on areas having different surface free energy.
Figure 12B:
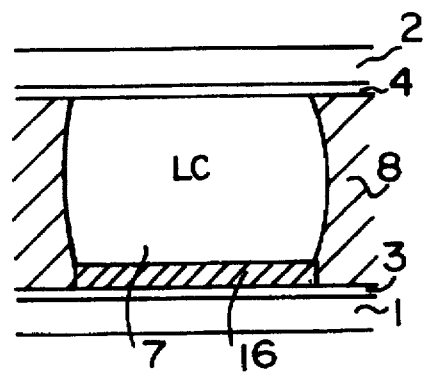

Further, it is preferable to use a monomer including a F atom for forming the pattern in the nonpixel portion on the substrate because this allows the surface free energy thereon to extremely decrease. In this case, the effect of the present invention can be obtained by forming a thin film having larger surface free energy on a pixel.

ii) In the case where the surface free energy $\gamma_{LC}$ of the liquid crystal material<the surface free energy $\gamma_M$ of the polymeric material:

In this case, it is possible to form the polymeric wall 8 in a non-pixel portion by forming an area having smaller surface free energy in at least part of a pixel by using the projection 16 than that in the non-pixel portion as shown in (a) of FIG. 12.

In this manner, in both the case described in the above items i) and ii), the area having a different surface free energy is formed on the substrate 1 in a patterned manner. The liquid crystal material is thus trapped within a certain area by using the difference in the surface free energy. When the area having different surface free energy is formed on both substrates 1 and 2, the effect is preferably further enforced. In this case, it is not necessary to have the pattern on one of the substrates coincide with that on the other. For example, for a simple matrix driven cell, striped areas having different surface free energy are formed on the substrates 1 and 2 and the substrates are facing each other so that the stripes cross at a right angle.

(2) Method by reforming the surface of a substrate

The control of surface free energy can be achieved by selectively reforming the surface of a substrate instead of using a material having different Surface free energy as described above. In this method, the surface of an alignment film is selectively reformed through a rubbing treatment, thereby phase-separating and arranging the polymeric material and the liquid crystal material. Specifically, the difference in the level is regularly formed by using an electrode or a thin film, and a touch of the pile of the rubbing cloth used in the rubbing treatment is adjusted; or at a specified position on the surface of the alignment film a thin film such as a resist is further formed, and then the rubbing treatment is conducted thereon. By using such a method, the characteristics of the surface of the alignment film can be varied between an electrode portion and a non-electrode portion. Such reforming can selectively provide the surface of the alignment film with optical anisotropy. It is also possible to control the polymerization rate and the movement of the liquid crystal material and the polymeric material caused by the polymerization because the roughness on the surface of the alignment film is different from portion to portion due to a difference in the cell gap caused by the level difference by using the electrode or the like and a difference in the rubbing intensity. The liquid crystal material and the polymeric material can be definitely phase-separated by using such a function and the polymeric wall can be formed in a patterned manner.

Specifically, a rubbing method, a glow discharge method, a chemical treatment such as etching and irradiation of electromagnetic wave or radiation can be used. The rubbing method is conventionally used for orienting liquid crystal molecules in a specified direction. The present invention uses the change of the surface free energy of liquid crystal molecules against a substrate depending upon the rubbing intensity.

The rubbing treatment is conducted by rubbing the substrate in a specific direction, and the surface reform caused by this mechanical friction is used. Therefore, by the selectively varying the rubbing intensity depending upon positions on the substrate, the surface free energy can be controlled. Although the rubbing intensity can be controlled by pressure, rate and the number of the mechanical rubbings, the following controlling methods can be adopted on a scale of the size of the pixel: The intensity of the rubbing is selectively weaken by protecting the alignment film by using a pattern formed of a photosensitive resin or the like; the surface of the alignment film to be subjected to the rubbing treatment is previously provided with irregularity, thereby selectively controlling the rubbing intensity; and a pattern is previously formed on the alignment film by using the same rubbing material as that used for the rubbing treatment.

The rubbing intensity can be controlled on a scale of the size of the pixel by the glow discharge method, etching, or the irradiation of electromagnetic wave or radiation.

A mixture of liquid crystal material and a polymeric material is injected into a cell formed by attaching a pair of substrates to each other, and the phase-separation is caused therein. At this point, as described above, the liquid crystal phase is collected in an area where the interfacial free energy against the liquid crystal phase is low. Therefore, it is possible to place a liquid crystal region at a desired position in a desired shape also by this method using the reform of the alignment film.

(3) Method by applying an electric field:

When the phase-separation is caused under the application of an eternal force such as an electric field, it is also possible to collect the liquid crystal phase that has a higher dielectric constant on an electrode by using a difference in the dielectric constant between the liquid crystal phase and the isotropic phase. This is because when an electric field is applied to a material having a high dielectric constant, free energy is varied by electric field energy charged in the space by the applied electric field and the dielectric flux density formed therein. At this point, it is necessary to consider the work of a power supply for discussing the thermodynamic equilibrium. The energy lost by the power supply together with the flow of charge due to the application of a voltage is twice as large as the electric field energy charged in this space. The free energy of the entire system including the power supply is decreased by the amount of the electric field energy charged in this space, and the electric field energy is dispersed as heat in the end. Therefore, the larger the dielectric constant of the material present in the space to which the electric field is applied by the power supply, the more the free energy of the entire system is decreased. Thus, the equilibrium of the system is varied so as to decrease the free energy.

Specifically, when the dielectric constant of the liquid crystal phase is higher than that of the isotropic phase, and when an electric field is applied to some areas and not applied to other areas, the liquid crystal phase is distributed to the areas where the electric field is applied and the isotropic phase is distributed to the areas where the electric field is not applied. By fixing the distributed phases, a liquid crystal region can be collected within the electric field. The voltage is preferably applied by using an electrode for display, because, in such a case, not Only the liquid crystal material required for the display is collected on the electrode, but also the shape of the formed liquid crystal region matches with that of the electrode.

(4) Method by applying a magnetic field:

It goes without saying that the control of a liquid crystal region by using an external force can be realized by a magnetic field as well as an electric field. In this case, the difference in the magnetic permeability between the liquid crystal phase and the isotropic phase is used. The basic mechanism is identical to that of an electric field except for the following: In using a magnetic field, a cell containing a mixture is required to be sandwiched between substrates having high magnetic permeability on which e pattern is formed by using the difference in the magnetic permeability; and a magnetic field is externally applies to the cell.

(5) Method by controlling the gap:

The phase-separation can be conducted also by controlling the gap between the two substrates in a display device. In this method, before attaching the substrates to each other, an irregularity is formed by using a photosensitive resin or the like on at least one of the surfaces of the substrates bearing a complex film of the liquid crystal material and the polymeric material. Thus, the gap between the substrates becomes irregular. Since interface free energy (interface) tension works on the interface between the separated phases so as to minimize the interface, the respective phases move into positions that make the interface therebetween as small as possible. This is because the equilibrium of the system moves so as to make the increase of the free energy caused by the phase-separation as small as possible.

In the present invention, since a liquid crystal region is surrounded by polymeric walls, the liquid crystal phase is surrounded by the interface therebetween. Therefore, after the phase-separation, the liquid crystal phase and the isotropic phase take positions that minimize the interface under the condition of maintaining the respective volumes approximately the same, namely, the liquid crystal phase is positioned in an area having a larger gap and the isotropic phase is positioned in an area having a smaller gap.

In this manner, the phase-separated liquid crystal material can be trapped within a specified area by using the difference in the surface free energy of the substrate. When the mixed ratio of the liquid crystal material to the polymerizable material is large, however, the adjacent liquid crystal regions corresponding to the adjacent pixels are combined with each other. This can occasionally cause the roughness of the display. A liquid crystal display device of this invention can attain uniform display characteristics by completely separating the liquid crystal material and the polymeric material in each pixel. Therefore, it is preferable to adopt other methods together with this method using a difference in the surface free energy to control the movement of the liquid crystal material and the polymeric material.

An example of the other methods includes a method in which the cell gap of an area for the liquid crystal region is made larger than the cell gap of an area for the polymeric wall. In this case, it is preferable that the cell gap $d_1$ of a pixel during the production of the display device and at least part of the cell gap $d_2$ (the minimum value) of a non-pixel portion satisfy the following:

$$0.1 \times d_1 \leq d_2 \leq 0.9 \times d_1$$

When the cell gap $d_2$ is smaller than $0.1 \times d_1$, a longer time is required for the vacuum injection of the mixture into the cell. When the cell gap $d_2$ is larger than $0.9 \times d_1$, the liquid crystal material cannot be definitely separated from the polymeric material in the cell gap.

(6) Method using polymerization at a temperature over the miscible temperature $T_{N-I}$ of liquid crystal material and annealing:

In the production procedure of this invention, the mixture of the liquid crystal material and the polymerizable material is injected into a cell having a pattern formed with the surface free energy arrangement. After this, the polymerization can be conducted at a temperature that exceeds the miscible temperature $T_{N-I}$ of the liquid crystal material. The cell is then annealed (cooled slowly), thereby separating the liquid crystal material from the polymeric material. When a photopolymerizable material is used, a longer polymerization reaction time enables the liquid crystal material and the polymerizable material move more smoothly. Therefore, the intensity of UV rays is preferably 50 mW/cm$^2$ (at a wavelength of 365 nm) or less, and more preferably 10 mW/cm$^2$ or less. Further, in order to conduct the polymerization reaction uniformly in the cell, it is preferable that less collimated light is used.

With regard to the combination of the liquid crystal material and the polymerizable material, it is preferable that the miscible temperature between them is in the range between 30° C. and 120° C. When those materials having a miscible temperature of lower than 30° C. are used, a larger amount of the polymeric material remains in the liquid crystal region, or a larger amount of the liquid crystal remains in the polymeric wall after the phase-separation. In the former case, the response rate and retardation d·Δn can be decreased, thereby decreasing the light transmittance under application of no voltage. In the latter case, since an area including the liquid crystal material not responding to an applied voltage is formed, the black level under the application of a voltage is decreased. When the liquid crystal material and the polymeric material having a miscible temperature higher than 120° C. are used, the processing temperature during the production becomes too high, thereby causing unpreferable reactions such as decomposition and polymerization of the used materials.

(7) Method by conducting thermal phase separation and than polymerization with UV rays:

The following method is preferable to attain more satisfactory phase-separation. Before causing the phase-separation by the polymerization reaction, the mixture of the liquid crystal material and the polymerizable material is annealed from a temperature exceeding the isotropic temperature to a temperature below the isotropic temperature. This annealing causes a thermal phase-separation of the mixture, thereby forming a liquid crystal rich area where the mixed ratio of the liquid crystal material is larger and a polymer rich area where the mixed ratio of the polymeric material is larger. Thus, the concentration of the polymerizable material is previously increased before the polymerization, resulting in a more definite phase-separation. In this case, when the mixing energy of the liquid crystal material and the polymerizable material is thermally higher, i.e., when the liquid crystal material is unlikely to be uniformly mixed with the polymerizable material, they can be more definitely separated without any of the above-mentioned problems.

(8) Combination of the above-mentioned methods:

It is possible to use some of the above-mentioned methods (1) through (7) together. Naturally these methods must be combined so as to realize the desired position of the liquid crystal region.

For example, the methods can be combined as follows: A pair of substrates are respectively provided with an electrode so that a voltage is applied to a pixel alone. A photosensitive resin having large surface free energy against a liquid crystal phase is coated in a non-pixel portion of each substrate in a patterned manner. The substrates are attached to each other with a spacer therebetween. A mixture of liquid crystal material and a polymerizable material is injected into the thus produced cell, and then the phase-separation is caused while applying a voltage to the pixel electrode in the cell. Thus, three kinds of the controlling methods, that is, one using interfacial free energy, one using an electric field and one using a gap between the substrates, can be used together. In this manner, the position and the shape of a liquid crystal region can be more accurately controlled.

6. Method for fixing the shape of a liquid crystal region

After positioning the liquid crystal phase and the isotropic phase in the desired shape by any of the above-mentioned controlling methods, it is necessary to fix the phases as they are. In one method, the prepolymer in the isotropic phase is polymerized in order to be changed into a polymer. When the mixture injected between the substrates at a temperature where the mixture is in a single isotropic phase is annealed to cause the phase-separation, the mixed ratio of the prepolymer in the isotropic phase is higher than that in the liquid crystal phase. Therefore, when the polymerization is initiated, the reaction rate in the isotropic phase is higher. Thus, a polymeric wall can be formed in a non-pixel portion and not in a pixel contributing to the display. It is preferable to initiate the polymerization by a method in which the temperature of the display device is not largely varied.

In this manner, a liquid crystal region can be formed at a desired position by controlling the free energy.

Next, the characteristics of the liquid crystal material in the liquid crystal region after the phase-separation and each material used in the present invention will be described.

Figure 13A:
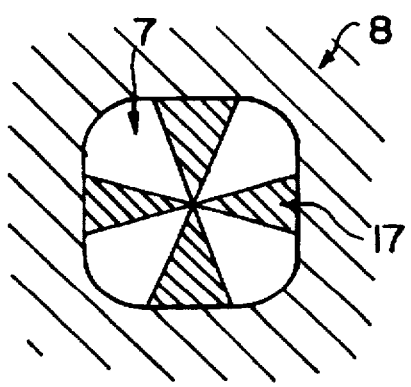
FIGS. 13A and 13B are conceptual views of a pixel region according to the present invention in which the alignment regulation force on a substrate is not used.
Figure 13B:
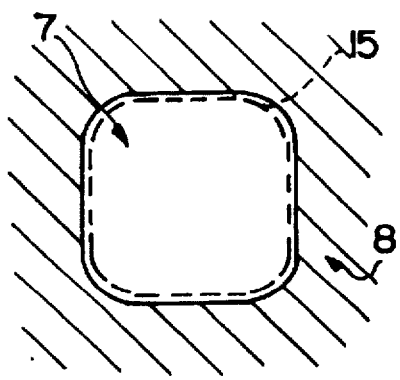

(1) Orientation of liquid crystal molecules in a domain:

The liquid crystal domain in the liquid crystal display device of this invention is applicable to the following two systems:

(a) In the case where an alignment regulating force on a substrate is not used:

FIG. 13A is a conceptual view of a pixel region under application of no voltage observed using a polarizing microscope, and FIG. 13B is a conceptual view of the pixel region under application of a voltage observed with a polarizing microscope. As shown in FIG. 13A, a liquid crystal 7 includes one liquid crystal domain, and a cross-shaped schlieren texture 17 is formed along the polarization axes of the polarizing plates of the liquid crystal display device under the application of no voltage. This reveals that the liquid crystal molecules are oriented axisymmetrically with respect to the disclination point at the center of the pixel region. In the liquid crystal domain having such an orientation of the liquid crystal molecules, a disclination line 15 is formed only in the peripheral portion of the domain under application of a voltage as shown in FIG. 13B. Thus, the disclination line 15 can be intentionally formed outside of the display area of the pixel. Therefore, by forming the disclination line 15 under a light-shielding layer, which is generally formed in the vicinity of the display area on The substrate so as to prevent light leakage, the black level of the liquid crystal display device can be improved, resulting in improved contrast.

When a voltage is applied to such a liquid crystal display device, the liquid crystal molecules rise vertically to the cell. At this point, since the liquid crystal molecules rise axisymmetrically while keeping the initial orientation under the application of no voltage, the apparent refractive index from any direction is uniform, resulting in improved viewing angle characteristics.

(b) In the case where an alignment regulating force on the substrate is used:

When the method of the present invention is applied to a substrate bearing an alignment film subjected to the rubbing treatment or the like, it is possible to produce a liquid crystal display device in which liquid crystal molecules are substantially surrounded by polymeric walls and are oriented in accordance with an alignment regulating force on the substrate. Such a liquid crystal display device is applicable to any ordinary display device such as TN, STN, FLC and ECB liquid crystal display devices. This liquid crystal display device is characterized in that the thickness of the cell is less varied by an external pressure as compared with a conventional display device having no polymeric walls within the display area of the entire device, and hence the characteristics thereof are less varied.

Figure 14A:
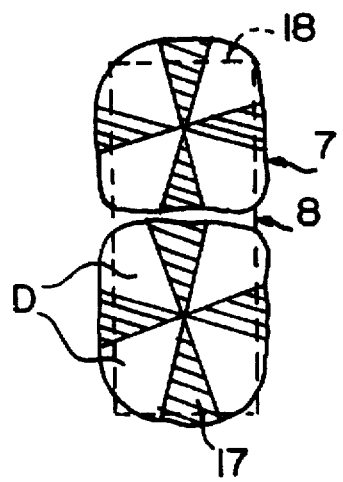
FIGS. 14A and 14B are plan views of a pixel in the case where a plurality of liquid crystal regions are present in a pixel.
Figure 14B:
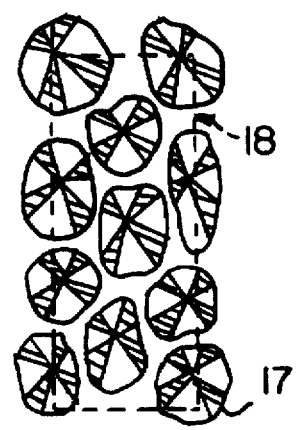

(2) Number of domains in a pixel:

It is preferable that the number of the liquid crystal domains in a pixel are as small as possible. When a large number of domains are present in one pixel, disclination lines are formed among the domains, thereby decreasing the black level. It is preferable that a pixel is covered with a single domain in which the liquid crystal molecules are axisymmetrically oriented. In this case, since the disclination line is formed in the peripheral portion of the domain under application of a voltage, a disclination line scarcely appear within the pixel. Moreover, when a liquid crystal display device includes a rectangular pixel region 18 as shown in FIGS. 14A and 14B, it is possible to form a liquid crystal region 7 including at least two domains, each of which includes liquid crystal molecules oriented axisymmetrically in a domain D. This type of display device is as good as the monodomain type display device in the viewing angle characteristics. Further, when the vertical and the horizontal directions of the cross of the schlieren texture 17 formed in the pixel region 18 shown in FIG. 13A are matched with the respective polarization axes of the polarizing plates, the schlieren texture 17 can be made so as to be hardly seen under application of a voltage.

(3) Method for avoiding the formation of a disclination line:

It is possible to suppress the formation of a disclination line by adding a polymerizable material having a molecular structure similar to that of a mesogen group of a liquid crystal molecule exemplified below (hereinafter referred to as the polymerizable liquid crystal material) to the polymeric material to be contained in the mixture.

(a) Monofunctional polymerizable liquid crystal material:

A monofunctional polymerizable liquid crystal material includes one polymerizable group in each molecule. The addition of this molecule causes pretilt in a liquid crystal region, and the pretilt allows the liquid crystal molecules to be oriented so as not to form a disclination line. The disclination line is not formed for the following reason: In a cell in which a disclination line is formed at the peripheral portion of a liquid crystal region, reverse tilt is caused because the rising direction of the liquid crystal molecules is different between the vicinity of a polymeric wall and within a liquid crystal region. This difference causes a disclination line. In the cell containing the polymerizable liquid crystal material, however, it is assumed that the rising direction of the liquid crystal molecules are the same in the vicinity of a polymeric wall, and therefore, no disclination line is formed.

Figure 15:
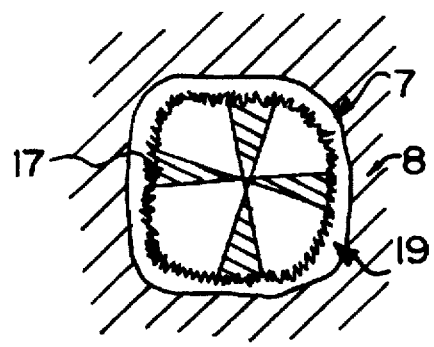
FIG. 15 is a plan view of an example of a pixel containing a bifunctional polymerizable liquid crystal material observed through a polarizing microscope.

(b) Bifunctional polymerizable liquid crystal material:

A bifunctional polymerizable liquid crystal material includes two polymerizable groups in each molecule. This material exhibits an effect for retaining the orientation of the liquid crystal molecules horizontally to a substrate. Moreover, when a polymerizable material including this polymerizable liquid crystal material is polymerized under the application of an electric field or a magnetic field, no disclination line is formed. When a cell produced by using this material is observed with a polarizing microscope, a dark area 19 is found to be present in the vicinity of a polymeric wall 8 as shown in FIG. 15. This dark area 19 is assumed to be an area where the twist structure of the liquid crystal material is not contained, and it is also presumed that the twist direction of a liquid crystal molecule is reversed with this area as a boundary.

(4) Method for orienting liquid crystal molecules axisymmetrically:

For the axisymmetrical orientation of the liquid crystal molecules. It is preferable that an external force is applied to the liquid crystal molecules so as to align the director of the liquid crystal in one direction (vertically to the cell) during the phase-separation of the liquid crystal material and the polymeric material. By the application of the external force, the liquid crystal molecules are oriented axisymmetrically when seen from the direction vertical to the cell, as understood from the cross-shaped schlieren texture shown in a conceptual view observed through a polarizing microscope of FIG. 14.

A preferable external force applied to the liquid crystal molecules to align the director thereof is an electric field, a magnetic field or the combination thereof. Since a liquid crystal display device has an electrode for applying a voltage to the liquid crystal molecules, the most preferable force is an electric field. The intensity of the applied force is required to be sufficient to align the director, that is, over the threshold value of the used liquid crystal material.

(5) Photopolymerizable material:

The polymerizable material to be used is a photopolymerizable material, a thermosetting material or the like. Examples of the photopolymerizable material include acrylic acid and acrylate having a long chain alkyl group with 3 or more carbon atoms or a benzene ring, such as isobutyl acrylate, stearyl acrylate, lauryl acrylate, isoamyl acrylate, n-butyl methacrylate, n-lauryl methacrylate, tridecyl methacrylate, 2-ethylhexyl acrylate, n-stearyl methacrylate, cyclohexyl methacrylate, benzyl methacrylate, 2-phenoxyethyl methacrylate, isobornyl acrylate, and isobornyl methacrylate; and a multi-functional material having two or more functional groups for enhancing the physical strength of the polymer such as bisphenol A dimethacrylate, bisphenol A diacrylate, 1,4-butanediol dimethacrylate, 1,6-hexanediol dimethacrylate, trimethylol propane trimethacrylate, trimethylol propane triacrylate, tetramethylol methane tetraacrylate, and neopentyl diacrylate.

Further, a halogenated photopolymerizable material, particularly, a chlorinated or fluorinated material is preferably contained as a material having a small refractive index. Owing to such a material, the liquid crystal molecules are prevented from entering the polymeric wall after the phase-separation, and the display characteristics with regard to the anchoring intensity on the surface of the polymeric material such as a driving voltage and hysteresis are improved. Furthermore, when a halogenated photopolymerizable material is used, the refractive index of the liquid crystal material matches that of the polymeric material. When the refractive index of the liquid crystal material with respect to ordinary light matches that of the polymeric material, light is prevented from scattering under the application of a voltage. Examples of such a halogenated material include 2,2,3,4,4,4-hexafluorobutyl methacrylate, 2,2,3,4,4,4-hexachlorobutyl methacrylate, 2,2,3,3-tetrafluoropropyl methacrylate, 2,2,3,3-tetrachloropropyl methacrylate, perfluorooctylethyl methacrylate, perchlorooctylethyl methacrylate, perfluorooctylethyl acrylate, and perchlorooctylethyl acrylate.

Any of the above described photopolymerizable materials can be used as a thermosetting material when a thermopolymerization initiator is added thereto. A compound having an epoxy group in a molecular can be used as the thermosetting material. Specific examples include bisphenol A epoxy compounds, bisphenol A diglycidylate, bisphenol F diglycidylate, hexahydro bisphenol A diglycidylate, propylene glycol diglyoidylate, neopentyl glycol diglycidylate, diglycidyl phthalte, and triglycidyl isocyanate. One or a combination of two or more of these monomers can be used.

(6) Photopolymerimation inhibitor:

In order to increase the size of a liquid crystal droplet, it is preferable to add a compound for inhibiting the polymerization reaction in addition to the above-mentioned polymerizable monomers. When a polymeric wall is formed immediately after light irradiation, the polymeric wall is formed until the movement of the monomer and the liquid crystal material is finished, resulting in failing to form the polymeric wall in accordance with a desired pattern. Specific examples of such a photopolymerization inhibitor include monomers and compounds in which, after the formation of a radical, the radical can be stabilized in a resonance system, such as styrene, p-fluorostyrene, p-chlorostyrene, p-methylstyrene, p-phenylstyrene, and nitrobenzene.

(7) Photopolymerization initiator:

General photopolymerization initiators such as Irgacure 651, Irgacure 184, Irgacure 907 (manufactured by CIBA-GEIGY Corporation), Darocure 1173, Darocure 1116 and Darocure 2959 (manufactured by E. Merk) can be used. A sensitizer or the like that is polymerizable with visible light can be also be used to increase the holding ratio. The holding ratio is defined by $(C/C_0 \times 100)\%$, where $C_0$ is an amount of charge accumulated in a liquid crystal cell, and C is an amount of charge held for 16.5 ms.

When a thermosetting material is used, a radical generator such as biphenyl oxide, peroxides such as t-butyl peroxide and AIBN can be used as the thermosetting initiator.

The amount of the polymerization initiator to be added depends upon the reaction characteristics thereof, and therefore, is not specified in the present invention. It is, however, preferred that the mixed ratio of the initiator is 0.01% through 5% of the entire mixture including liquid crystal material and a polymerizable material (including a polymerizable liquid crystal material) for the following reason: When the mixed ratio exceeds 5%, the rate of the phase-separation between the liquid crystal material and the polymeric material is too fast to be controlled, and the thus formed liquid crystal droplet is so small that a higher driving voltage is required. Moreover, the alignment regulating force of the alignment film on the substrate is weaken, and the liquid crystal region in a pixel becomes smaller (in using a photomask, the liquid crystal droplet is formed in a light shielded portion), thereby decreasing the contrast. When the mixed ratio is below 0.01%, the polymerizable material cannot be sufficiently polymerized.

(8) Liquid crystal material:

The liquid crystal material to be used in the present invention is an organic mixture exhibiting a liquid crystalline state around room temperature. Examples of such liquid crystal materials include nematic liquid crystal (including liquid crystal for dual frequency drive; including liquid crystal having a dielectric constant anisotropy $\Delta\epsilon<0$), cholesteric liquid crystal (in particular, liquid crystal having selective reflection characteristics with respect to visible light), smetic liquid crystal, ferroelectric liquid crystal, and discostic liquid crystal. A mixture of these liquid crystal material can be used, and in particular, nematic liquid crystal or a mixture of nematic liquid crystal and cholesteric liquid crystal (a chiral agent) is preferred in terms of the characteristics. More preferably, liquid crystal excellent in chemical reaction resistance is used because of the photopolymerization effected during the processing. Specific examples of such liquid crystal materials include those having a functional group such as a fluorine atom, for example, ZLI-4801-000 and ZLI-4792 (manufactured by Merck & Co., Inc.).

(9) Polymerizable liquid crystal material:

In order to inject the mixture of liquid crystal material and a polymerizable material with liquid crystallinity in a nematic state for polymerization, it is preferable to use a polymerizable liquid crystal material, which has the characteristics of both the liquid crystal material and the polymerizable material. By using such a material, the volatility of a photopolymerizable material during the vacuum injection can be decreased, and the change, caused during the injection, in the components of the mixture including the liquid crystal material, a photopolymerizable material and a photopolymerization initiator can be suppressed. In selecting liquid crystal material and a liquid crystal material having a polymerizable functional group in its molecule, it is preferred, from the viewpoint of miscibility, that the materials to be selected have similar portions for exhibiting the liquid crystalline characteristics. Particularly, when a fluoric or chloric liquid crystal material, which has specific chemical characteristics, is used, it is preferred that the polymerizable liquid crystal material to be used together is also a fluoric or chloric compound.

An example of such materials having a polymerizable functional group in its molecule, which is not specified in this invention, includes a compound represented by Formula 1 below. By using such a compound, the liquid crystallinity of the liquid crystal molecules of the liquid crystal material working as a host is hardly disturbed.

Formula 1:

A—B—LC

In Formula 1, A indicates a polymerizable functional group having an unsaturated bond such as $CH_2=CH-$, $CH_2=CH-COO-$, $CH_2=CH-COO-$, 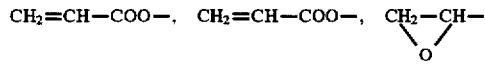

or having a heterocyclic ring structure with distortion. B in Formula 1 indicates a coupling group for connecting the polymerizable functional group with a liquid crystalline compound such as an alkyl chain ($-(CH_2)_n-$), an ester bond ($-COO-$), an ether bond ($-O-$), a polyethylene glycol chain ($-CH_2CH_2O-$) and a combination thereof. For attaining liquid crystallinity when mixed with the liquid crystal material, the most preferable coupling group is one having a length with 6 or more bonds from the polymerizable functional group to the rigid portion of a liquid crystal molecule. LC in Formula 1 indicates the liquid crystalline compound such as a compound represented by the following Formula 2, a cholesterol ring or its derivatives:

Formula 2:

D—E—G wherein G indicates a polar group for allowing the dielectric constant anisotropy and the like of the liquid crystal material to be exhibited such as a benzene ring, a cyclohexane ring, a paradiphenyl ring, a phenylcyclohexane ring having a functional group such as $-CN$, $-OCH_3$, $-F$, $-Cl$, $-OCF_3$, $-OCCl_3$, $-H$, $-R$ (wherein R indicates an alkyl group); E indicates a functional group for connecting D with G such as a single bond, $-CH_2-$, $-CH_2CH-$, $-CH_2CH_2-$, $-O-$, $-C\equiv C-$, $-CH=CH-$; and D indicates a functional group to be connected with B in Formula 1 such as a paraphenyl ring, a 1,10-diphenyl ring, a 1,4-cyclohexane ring and a 1,10-phenylcyclohexane ring. The group indicated by D affects the dielectric constant anisotropy and the refractive index anisotropy of the liquid crystal molecules.

(10) Mixed ratio of the liquid crystal material and the polymerizable material:

The mixed weight ratio of the liquid crystal material and the polymerizable material depends upon the size of a pixel. Preferably, the ratio of the liquid crystal material to the polymerizable material is 50:50 through 97:3, and more preferably 70:30 through 95:5. When the proportion of the liquid crystal material is below 50 wt %, the interaction between the polymeric wall and the liquid crystal material is increased, so an extremely high voltage is required to drive the cell. Thus, the resulting display device is not suitable for practical use. When the proportion of the liquid crystal material exceeds 97 wt %, the physical strength of the polymeric walk is decreased, resulting in an unstable performance of the display device. Further, the weight ratio of the liquid crystalline compound to the non-liquid crystalline compound is preferably 0.5 wt % or more. Particularly, when a ferroelectric liquid crystal material is used, the proportion of the liquid crystalline compound is preferably 100 wt %. In such a case, two types of regions are formed with liquid crystal material having a lower molecular weight and that having a higher molecular weight, respectively. When two kinds of voltages are used to drive the respective liquid crystal regions, such a display device works as a ferroelectric liquid crystal display device capable of gradient display.

(11) Driving method:

The cell produced by using the above-mentioned materials can be driven by the simple matrix drive method and the active matrix drive method using a TFT (A thin film transistor) or an MIM (a switching element with a structure of metal-insulator-metal). The driving method is not specified in this invention.

(12) Material for the substrate:

In using the photopolymerization, the material for the substrate can be any material which partially transmits light. Examples include glaze, quartz and transparent plastic materials. Further, when the device is used as a reflection type liquid crystal display device, a non-transparent substrate such as a Si substrate can be used as a reflecting substrate.

The present invention will now be described more in more detail by way of specific Examples and Comparative Examples. It is noted that the present invention is not limited to these Examples.

EXAMPLE 1

FIG. 1 is a sectional view of a liquid crystal display device of Example 1. As shown in FIG. 1, the liquid crystal display device includes a pair of substrates 1 and 2 made from glass or the like opposing each other, and a liquid crystal region 7 surrounded by polymeric walls 8, which work together as a display medium, sandwiched between the substrates 1 and 2. On the inner surface of the substrate 1 facing the display medium is formed an electrode wiring to provide an electrode 3. On the inner surface of the substrate 2 facing the display medium is formed an electrode wiring to provide an electrode 4. A portion where the electrodes 3 and 4 oppose each other works as a pixel. A thin film 5 is formed in a non-pixel portion on the inner surface of the substrate 1, and a thin film 6 is formed in a non-pixel portion on the inner surface of the substrate 2. Thus, the surface free energy of the non-pixel portion is smaller than that of a pixel.

The production method for such a liquid crystal display device is exemplified as follows:

The thin films 5 and 6 are formed on the substrates 1 and 2 bearing the electrodes 3 and 4, respectively. The thin films 5 and 6 can be formed a PI printing method, or by using a mask to obtain a desired pattern after coating the substrates with a material for the thin films by spin coating.

Figure 2:
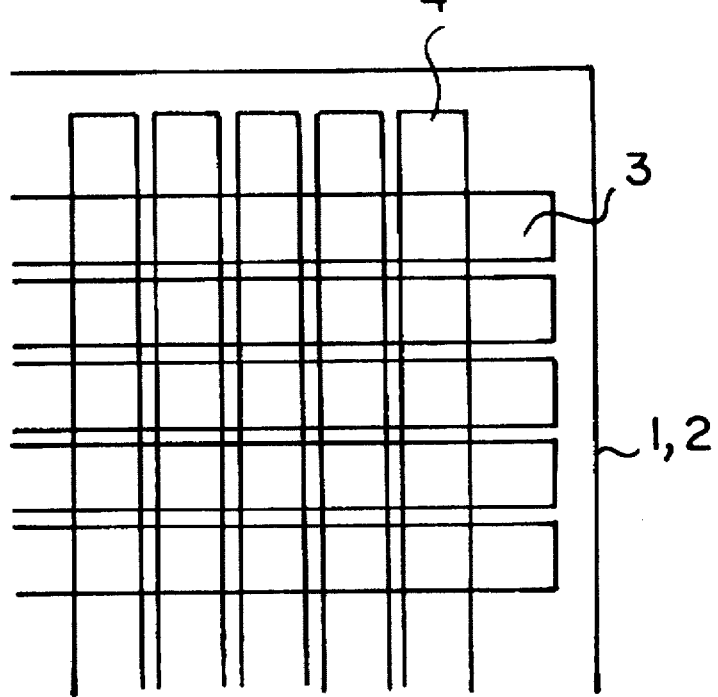
FIG. 2 is a plan view of electrodes in the liquid crystal display device of Example 1.

The substrates 1 and 2 bearing the electrodes 3 and 4 and the thin films 5 and 6 are allowed to oppose each other so that the electrodes 3 and 4 face each other in a manner as shown in FIG. 2. Then, the substrates 1 and 2 are attached to each other having a spacer with a thickness of 6 µm interposed therebetween. Thus, a cell is produced.

A mixture including at least liquid crystal material, a photopolymerizable material and a photopolymerization initiator, all of which are homogeneously mixed, is injected into the gap of the cell.

Then, the mixture is externally irradiated with UV rays. Through this irradiation, the photopolymerizable material collected on the thin films 5 and 6 in the non-pixel portions is polymerized into a polymer, thereby pushing aside the liquid crystal material onto the electrodes 3 and 4. Thus, the liquid crystal material and the polymeric material is phase-separated. As a result, the display medium in which the liquid crystal region 7 is surrounded by the polymeric walls 8 is formed between the substrates 1 and 2. The phase-separation of the liquid crystal material and the polymerizable material can be conducted more effectively by using a photomask as follows: The photomask having a light-shielding portion located so as to correspond to each pixel is formed on the inside or outside of the substrate on the side of the UV light source. The cell is irradiated with UV rays through the photomask.

Any liquid crystal material that is an organic mixture in a liquid crystalline state around room temperature can be used as described above.

In order to definitely phase-separate the liquid crystal and the polymeric material and to increase the response rate of the liquid crystal display device, a polymerizable liquid crystal material is added to the-mixture. The polymerizable liquid crystal material is a compound having both a polymerizable functional group such as acrylate and methacrylate and a functional group exhibiting a rigid liquid crystallinity. The polymerizable liquid crystal material is preferably selected, from the viewpoint of the miscibility, so that the portion exhibiting its liquid crystallinity is similar to that of the used liquid crystal material. Particularly, when fluoric or chloric liquid crystal material having specific chemical characteristics is used, a preferable polymerizable liquid crystal material is also a fluoric or chloric compound. When ferroelectric liquid crystal material is used, a polymerizable liquid crystal material having ferroelectric liquid crystallinity in its molecule is preferably used to obtain a stable smectic phase.

The weight ratio of the polymerizable liquid crystal material to the non-liquid crystalline polymerizable material in the mixture is 0.5 wt % or more. In particular, when ferroelectric liquid crystal material is used, the weight ratio of the polymerizable liquid crystal material is preferably 100 wt %. In this case, two kinds of regions can be formed with liquid crystal material having a lower molecular weight and that having a higher molecular weight, respectively. When two kinds of voltages are used to drive the respective liquid crystal regions, the resultant display device works as a ferroelectric liquid crystal display device capable of gray-scale display.

The weight ratio of the liquid crystal material to the photopolymerizable material is preferably 50:50 through 97:3, and more preferably 70:30 through 95:5. When the proportion of the liquid crystal material is below 50 wt %, the interaction between the polymeric wall and the liquid crystal material is increased, so an extremely high voltage is required to drive the cell. Thus, the resulting display device is not suitable for practical use. When the proportion of the liquid crystal material exceeds 97 wt %, the physical strength of the polymeric wall is too decreased to obtain stable performance.

As the photopolymerization initiator, Irgacure 651, Irgacure 184, Irgacure 907 (manufactured by CIBA-GEIGY Corporation), Darocure 1173, Darocure 1116 and Darocure 2959 (manufactured by E. Merk), and the like can be used.

The proportion of the polymerization initiator against the entire amount of the liquid crystal material and the photopolymerizable material is preferably 0.1 wt % through 5 wt %. When the proportion is below 0.1 wt %, sufficient photopolymerization cannot be conducted. When the proportion exceeds 5 wt%, the rate of the phase-separation is so high that the obtained liquid crystal region is small and a higher voltage is required to drive the cell.

As the material for the thin film formed on the substrate, a general polymer can be used. Examples include polyimide such as OFPR-800 (manufactured by Tokyo Oyo Kagaku), SE150 (manufactured by Nissan Kagaku), JALS-203 and JALS-204 (Nippon Synthetic Rubber Co., Ltd. ), a thermoplastic resin such as polystyrene, PMMA, polyphenyl oxide, polycarbonate, and a condensation polymer such as novolak. Further, a surface active agent can be added in order to have the value of the surface free energy of such a polymer approximate that of the photopolymerizable material. Any commercially available surface active agent can be used, although a nonionic surface active agent is preferred because an anionic surface active agent and a cationic surface active agent can decrease the holding ratio. The thin film is formed in order to make the surface free energy of the non-pixel portion smaller than that of the pixel so that the photopolymerizable material is collected in the non-pixel portion with ease. Therefore, the material for the thin film is not limited to the above-mentioned polymers but can be any polymeric material having surface free energy approximately the same as that of the photopolymerizable material.

The thin film has a surface free energy sufficiently near to that of the photopolymerizable material and the phase-separation is caused in the cell after the injection of the mixture. At this point, the mixture can be irradiated with UV rays so as to polymerize the photopolymerizable material without using a photomask or irradiation intensity distribution. Alternatively, it is possible to provide a regular intensity distribution in the UV-ray irradiation in a patterned manner in accordance with a desired diameter of a liquid crystal region (for example approximately the same size as a pixel). In this case, the photopolymerization is caused regularly with respect to the position, thereby locating liquid crystal regions each having a uniform shape and size regularly on the substrate. For example, in a strongly irradiated portion, the rate of the photopolymerization is fast, and the rate of the phase-separation between the liquid crystal material and the polymeric material is also fast. Therefore, the polymeric material is quickly deposited so as to push aside the liquid crystal material onto a weakly irradiated portion. As a result, a liquid crystal region is formed at a weakly irradiated portion, resulting in regularly positioned liquid crystal regions each having a uniform shape and size. By matching the strongly irradiated portion with the position of the thin film, the liquid crystal material and the polymeric material can be more definitely phase-separated.

When the UV-ray irradiation is allowed to have the intensity distribution, it is preferable to make the arrangement regular by using a photomask, a microlens, an interfering plate or the like. The photomask can be placed either inside or outside of the cell (i.e., on the surface of the substrate facing the display medium or the other surface thereof) as long as a regular pattern of the UV-ray irradiation can be obtained. When the photomask is away from the cell, the intensity distribution cannot be regular because the image of the photomask transferred onto the cell is blurred. Therefore, the photomask is preferably provided as close as possible to the mixture of the liquid crystal material and the photopolymerizable material.

Moreover, the light source used for the UV-ray irradiation preferably emits collimated light. In a ferroelectric liquid crystal display device, however, a smaller liquid crystal region is occasionally provided as a buffer around a liquid crystal region as large as a pixel in order to improve the shock resistance. In such a case, the edge of a portion shielded by the photomask or the like can be intentionally blurred by providing the photomask away from the cell, or by using a light source emitting less collimated light. In the intensity distribution by using the photomask or the like, the light intensity for a weakly irradiated portion is preferably 80% or less of the intensity for a strongly irradiated portion.

According to the study of the present inventors, when a photomask has a light shielding portion for providing the intensity distribution with a size of 30% or less of the size of a pixel, the obtained liquid crystal region has a size of 30% or less of the pixel. When the size of the liquid crystal region is 30% or less of that of the pixel as in this case, the interface between the liquid crystal material and the polymeric material in the pixel is so large that the contrast is extremely decreased due to the light scattering on the interface. In order to avoid such a problem, when using a photomask or the like the weakly irradiated portion should be larger than a pixel. Specifically, a preferred photomask has a light shielding portion so that the non-pixel portion alone is strongly irradiated. Further, in a liquid crystal display device of a non-scattering mode, which does not use the light scattering between the polymeric material and the liquid crystal material for the display, when the intensity distribution is provided by using a photomask or the like, the photomask or the like preferably has a light shielding portion for covering 30% or more of a pixel so as to locally decrease the UV-ray irradiation intensity.

The liquid crystal cell produced in this manner is provided with a pair of polarizing plates on the outer surfaces of the substrates. Thus, a liquid crystal display device is produced in which a liquid crystal material used in a conventional TN, STN, FLC (SSF) or ECB liquid crystal display device is surrounded as a liquid crystal region by polymeric walls. Further, such a liquid crystal display device can be used for wide viewing or made into a film. In this manner, a liquid crystal display device excellent in viewing angle characteristics and contrast can be produced.

Specific examples based on Example 1 will now be described.

EXAMPLE 1a

On substrates 1 and 2 made from flint glass (manufactured by Nippon Sheet Glass Co., Ltd.) with a thickness of 1.1 mm were respectively formed 200 electrodes 3 and 4 made of ITO. The surface free energy of the ITO electrode was 92.8 mN/m. Each of the electrodes 3 and 4 had a thickness of 50 nm and a width of 200 μm, and the interval therebetween was 50 μm. Portions of the resultant substrates 1 and 2 where the electrodes 3 and 4 did not overlap when the substrates 1 and 2 were attached to each other as shown in FIG. 2 (i.e., non-pixel portions) were coated with OFPR-800 (manufactured by Tokyo Oyo Kagaku) to form thin films 5 and 6. The surface free energy of the portions bearing the thin films 5 and 6 was 36 mN/m. The resultant substrates 1 and 2 were opposed to each other so that the electrodes 3 and 4 face each other and the portions bearing no thin films 5 and 6 faced each other, and the substrates were attached to each other with a spacer (not shown) with a diameter of 6 μm interposed therebetween in order to produce a cell.

A mixture of 0.1 g of trimethylol propane trimethacrylate, 0.4 g of 2-ethylhexyl acrylate and 0.5 g of isobornyl acrylate was used as a photopolymerizable material. ZLI-3700-000 (manufactured by Merck & Co., Inc.) including 0.3 wt % of cholesteric nonalate (CN) is used as a liquid crystal material. Irgacure 184 (manufactured by CIBA-GEIGY Corporation) was used as a photopolymerization initiator. The homogeneous mixture of the photopolymerizable material, 4 g of the liquid crystal material and 0.1 g of the photopolymerization initiator was injected into the cell.

By using a high pressure mercury lamp emitting collimated light, the cell was irradiated with UV rays at 10 mW/cm$^2$ for 10 minutes to polymerize the photopolymerizable material in the mixture. Thus, a liquid crystal region 7 was formed so as to be surrounded by polymeric walls 8 as shown in FIG. 1.

A pair of polarizing plates were attached to the outside of the liquid crystal cell so that the polarization axes thereof cross at a right angle.

In this manner, a liquid crystal display device excellent in viewing angle characteristics was obtained.

EXAMPLE 1b

A cell was produced in the same manner as in Example 1a and the same type of a mixture as that used in Example 1a was injected into the cell.

Figure 3:
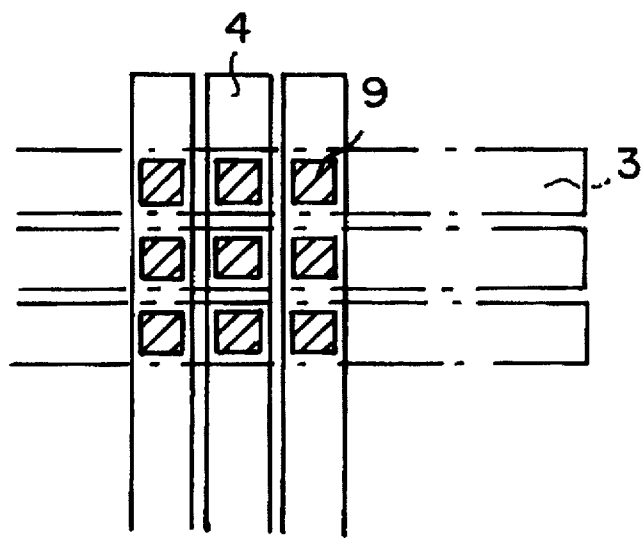

Then, a photomask having light shielding portions 9 corresponding to portions where the electrodes 3 and 4 overlap (i.e., pixels) as shown in FIG. 3 was provided on the liquid crystal cell. By using a high pressure mercury lamp emitting collimated light, the liquid crystal cell was irradiated with UV rays at 10 mW/cm$^2$ for 10 minutes through the photomask.

A pair of polarizing plates were attached to the outside of the liquid crystal cell so that the polarization axes thereof cross at a right angle as in Example 1a.

In this manner, a liquid crystal display device extremely excellent in viewing angle characteristics was obtained.

Comparative Example 1

Similarly to Example 1a, on substrates 1 and 2 made from flint glass (manufactured by Nippon Sheet Glass Co., Ltd.) with a thickness of 1.1 mm were respectively formed 200 electrodes 3 and 4 made of ITO. Each of the electrodes 3 and 4 had a thickness of 50 nm and a width of 200 μm, and the interval therebetween was 50 μm. The resultant substrates 1 and 2 were opposed to each other, and attached to each other with a spacer having a diameter of 6 μm therebetween. The same type of a mixture as that used in Example 1a was injected into the thus produced cell.

Also similarly to Example 1a, by using a high pressure mercury lamp emitting collimated light, the liquid crystal cell was irradiated with UV rays at 10 mW/cm$^2$ for 10 minutes to polymerize the photopolymerizable material.

A pair of polarizing plates were attached to the outside of the liquid crystal cell so that the polarization axes thereof cross at a right angle as in Example 1a.

Comparative Example 2

A cell was produced in the same manner as in Comparative Example 1 and the same type of mixture as that used in Example 1a was injected into the cell.

Then, similarly to Example 1b, a photomask having light shielding portions 9 corresponding to pixels was provided on the liquid crystal cell. By using a high pressure mercury lamp emitting collimated light, the liquid crystal cell was irradiated with UV rays at 10 mW/cm² for 10 minutes through the photomask.

A pair of polarizing plates were attached to the outside of the liquid crystal cell in the same manner as in Example 1a.

Table 1 shows the electro-optical characteristics of the respective liquid crystal display devices produced in Examples 1a and 1b and Comparative Examples 1 and 2.

TABLE 1

|  | Example 1a | Example 1b | Comparative Example 1 | Comparative Example 2 |
|---|---|---|---|---|
| $T_{off}$ | 43 | 53 | 9 | 43 |
| Driving Voltage (V) | 5.6 | 5.4 | 7.9 | 5.6 |
| Response Rate (ms) | 65 | 44 | — | 64 |

In Table 1, "$T_{off}$" indicates the light transmittance under the application of no voltage; "Driving Voltage" indicates a voltage at a time when the light transmittance is varied by 90%; and "Response Rate" indicates a value obtained by τr+τd under the application of 5 V. The results in Table 1 reveal that the liquid crystal display device of Example 1a exhibits contrast and a response rate as high as those of the liquid crystal display device of Comparative Example 2, which was produced in a conventional method using a photomask. Further, although the liquid crystal display device of Example 1b requires more steps for the production than that of Example 1a, the contrast and the response rate is further improved.

Figure 4A:
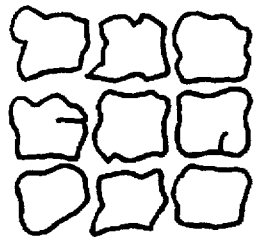
FIGS. 4A through 4D are schematic diagrams of images obtained by observing the formation of polymeric walls in liquid crystal display devices of Examples 1a and 1b and Comparative Examples 1 and 2 with a scanning electron microscope (SEM).
Figure 4B:
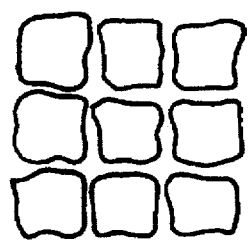
Figure 4C:
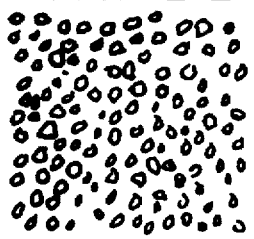
Figure 4D:
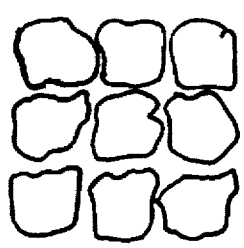

The liquid crystal display devices of Examples 1a and 1b and Comparative Examples 1 and 2 were cut, the substrates were peeled off in liquid nitrogen, and the liquid crystal material was washed with acetone. Then, the polymeric walls formed in the respective cells were observed under a scanning electron microscope (SEM). The observed images are shown in FIGS. 4A through 4D. As shown in FIG. 4A, the liquid crystal display device of Example 1a has regularly patterned polymeric walls similar to those in the liquid crystal display device of Comparative Example 2 (shown in FIG. 4D), which was produced in the conventional method using a photomask. Thus, it was confirmed that, in the liquid crystal display device of Example 1a, little polymeric material entered a pixel. The liquid crystal display device of Example 1b had, as shown in FIG. 4B, regularly patterned polymeric walls, and it was confirmed that much less polymeric material entered a pixel. The polymeric walls in the liquid crystal display device of Comparative Example 1 were irregularly formed as in a polymer dispersed liquid crystal display device.

EXAMPLE 1c

Figure 5A:
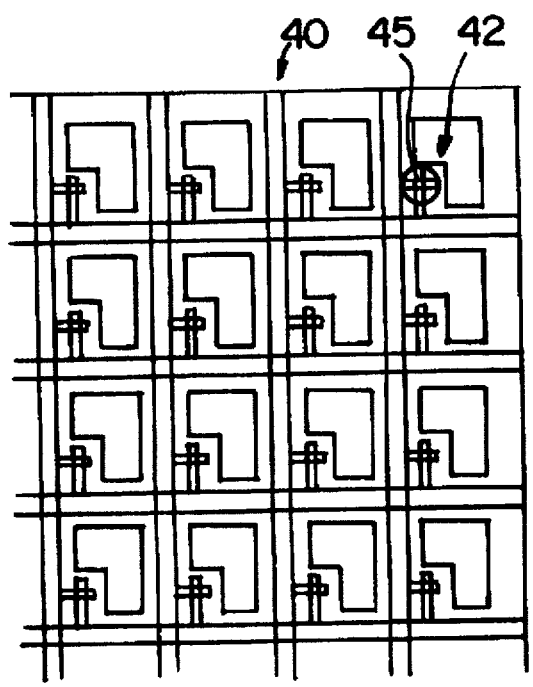
FIGS. 5A and 5B are plan views of a TFT substrate and a counter substrate in a liquid crystal display device of Example 1c and Comparative Example 3.
Figure 5B:
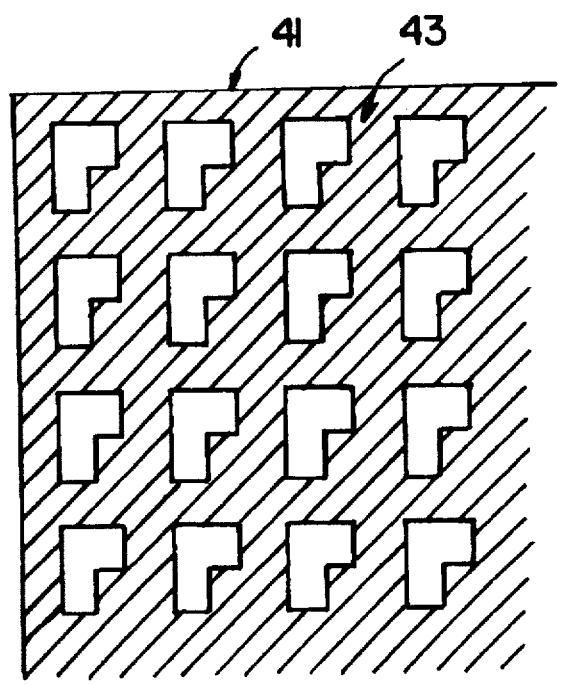
Figure 6:
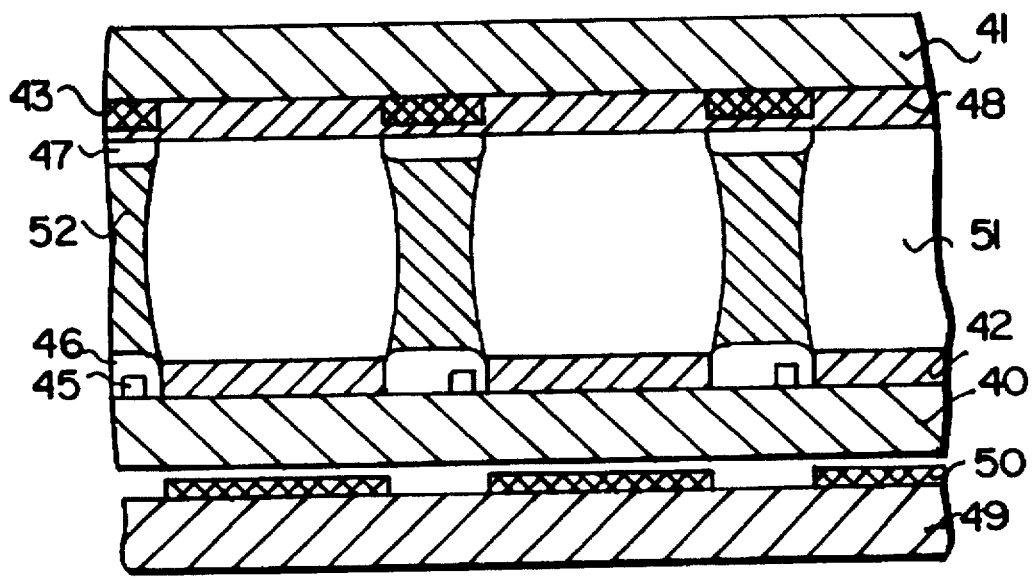
FIG. 6 is a sectional view of the liquid crystal display device of Example 1c and Comparative Example 3.
Figure 7A:
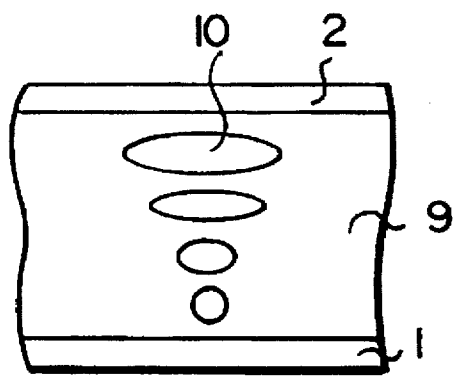
FIGS. 7A through 7C illustrate the principle of the viewing angle characteristics of a conventional liquid crystal display device.
Figure 7B:
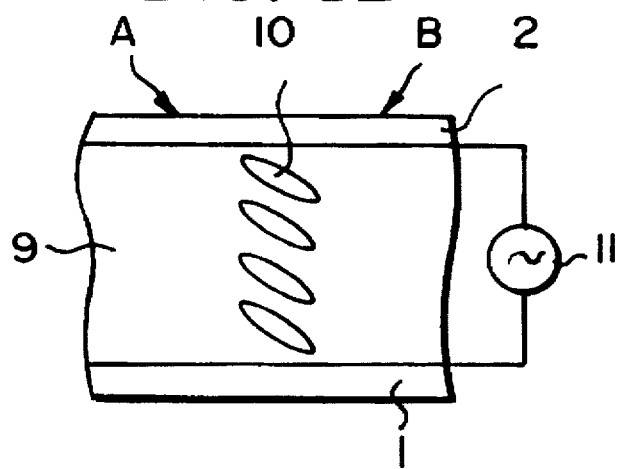
Figure 7C:
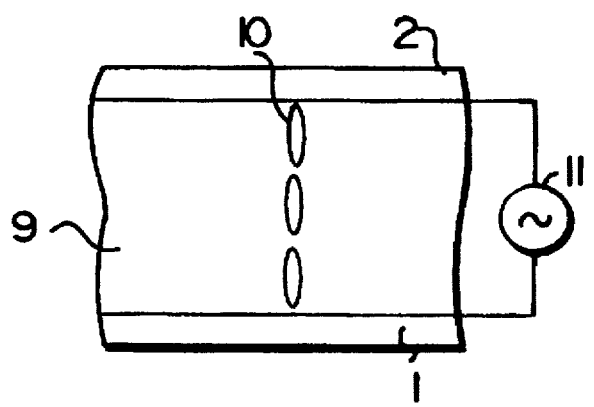
Figure 8A:
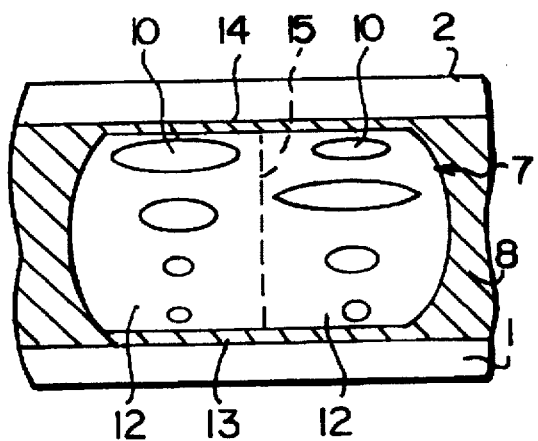
FIGS. 8A through 8C illustrate the principle of the improved viewing angle characteristics according to the present invention.
Figure 8B:
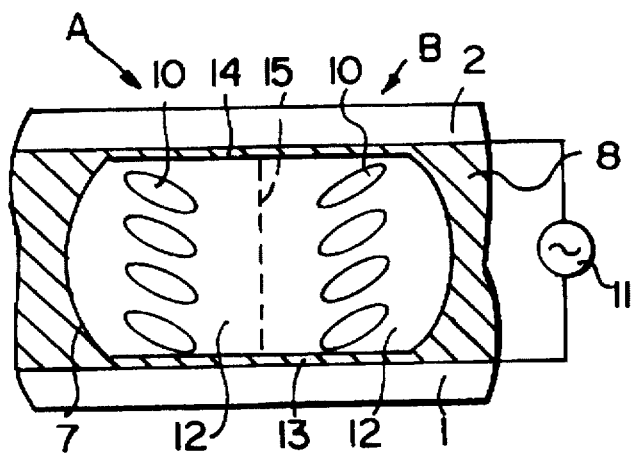
Figure 8C:
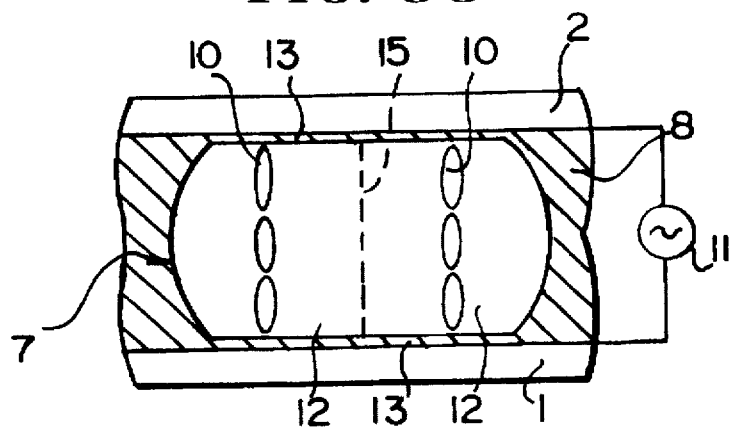

In this example, a liquid crystal display device driven by the TFT drive was produced. As shown in FIGS. 5A, 5B and 6, non-pixel portions on a TFT substrate 40 bearing TFTs 45 and pixel electrodes 42 and a black mask 43 on a counter substrate 41 were subjected to the PI printing with a thin film material. The used thin film material was JALS-340 (manufactured by Japan Synthetic Rubber Co., Ltd.) including a small amount of polyethylene glycol lauric acid monoester as a nonionic surface active agent. Thus, thin films 46 and 47 were formed. The surface free energy of the non-pixel portions bearing the thin films 46 and 47 was 33 mN/m. The surface free energy of a portion bearing no thin film was 79.5 mN/m. The resultant substrates 40 and 41 were attached to each other with a spacer (not shown) having a diameter of 5 μm therebetween. A counter electrode 48 opposing the pixel electrode 42 is formed over the black mask 43.

A mixture of 0.1 g of trimethylol propane trimethacrylate, 0.35 g of 2-ethylhexyl acrylate and 0.45 g of isobornyl acrylate was used as a photopolymerizable material. ZLI-4792 (manufactured by Merck & Co., Inc.) including 0.3 wt % of cholesteric nonalate (CN) is used as a liquid crystal material. Irgacure 184 (manufactured by CIBA-GEIGY Corporation) was used as a photopolymerization initiator. The homogeneous mixture of the photopolymerizable material, 4 g of the liquid crystal material and 0.15 g of the photopolymerization initiator was vacuum injected into the thus produced cell.

A photomask 49 having a light shielding portion 50 was disposed so that each pixel electrode 42 corresponds to each light shielding portion 50 as shown in FIG. 6. Then, the liquid crystal cell was irradiated with UV rays through the photomask at 10 mW/cm² for 10 minutes, thereby polymerizing the photopolymerizable material. Thus, a liquid crystal region 51 surrounded by polymeric walls 52 was obtained.

Comparative Example 3

Similarly to Example 1c, a TFT substrate 40 and a counter substrate 41 shown in FIGS. 5A and 5B were attached to each other with a spacer having a diameter of 5 μm therebetween. Thus, a cell was produced. The same type of mixture as that used in Example 1c was vacuum injected into the cell.

Also similarly to Example 1c, a photomask 49 having a light shielding portion 50 was disposed so that each pixel electrode 42 corresponds to each light shielding portion 50, and the liquid crystal cell was irradiated with UV rays through the photomask at 10 mW/cm² for 10 minutes.

The pixels of the liquid crystal display devices produced in Example 1c and Comparative Example 3 were observed through an optical microscope. In the pixel of the liquid crystal display device of Example 1c, the liquid crystal material and the polymeric material were phase-separated more definitely and less polymeric material entered the pixel than in the pixel of the liquid crystal display device of Comparative Example 3.

The electro-optical characteristics of these liquid crystal display devices were measured. The liquid crystal display device of Example 1c was superior to that of Comparative Example 3 in the contrast and the response rate.

In Examples 1, 1a through 1c, the liquid crystal display devices of the non-scattering mode were described. The present invention is, however, not limited to this and is applicable to a liquid crystal display device of the scattering-transmittance mode.

Also in the above-mentioned examples, the liquid crystal display devices were driven by the simple matrix drive method or TFT drive method. The present invention is, however, applicable to a liquid crystal display device driven by the active drive method using an MIM or the like. Thus, the driving method is not specified.

Further, as the substrates opposing each other, a pair of plastic film substrates and the like can be used.

EXAMPLE 2

This example is similar to Examples 1 and 1a through 1c, and like reference numerals are used to refer to like elements.

Figure 16A:
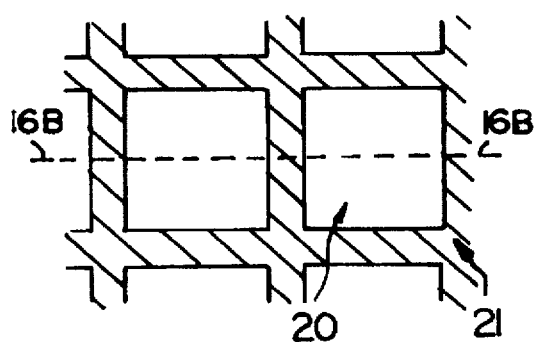
FIGS. 16A and 16B illustrate a resist pattern on a substrate formed in Example 2.
Figure 16B:
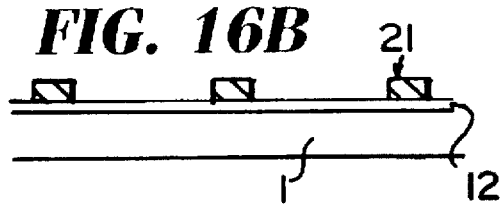
Figure 18B:
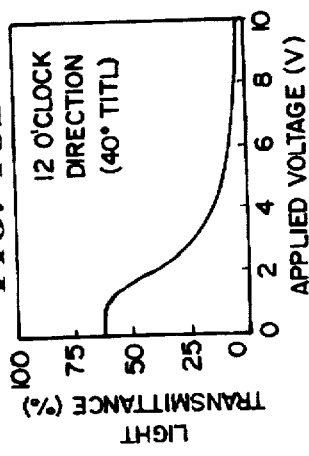
FIGS. 18A through 18F are graphs showing the viewing angle characteristics of the liquid crystal display device produced in Example 2.
Figure 18A:
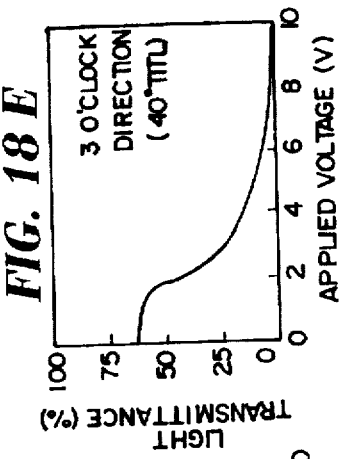
Figure 18C:
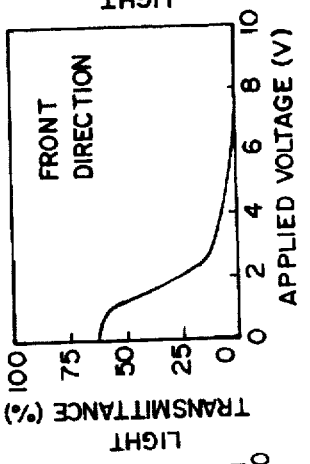
Figure 18D:
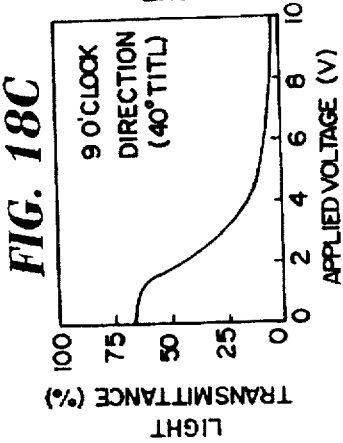
Figure 18E:
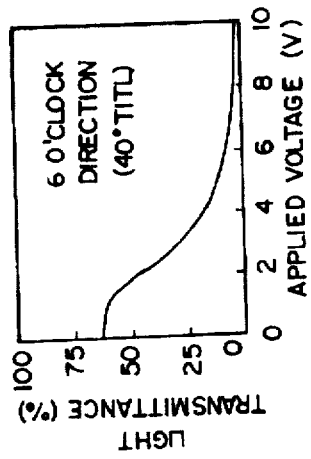
Figure 18F:
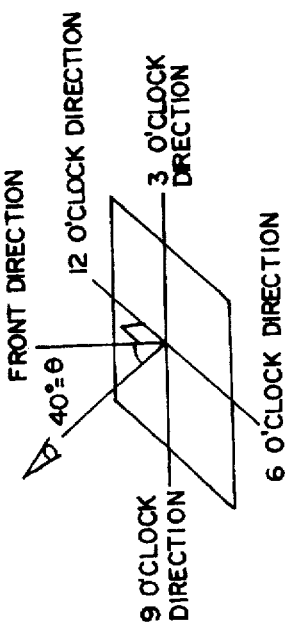
Figure 19B:
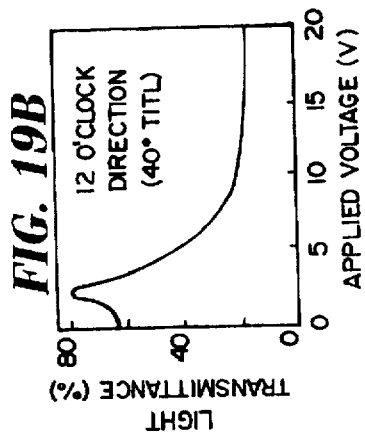
FIGS. 19A through 19F are graphs showing the viewing angle characteristics of a TN cell of Comparative Example 5.
Figure 19A:
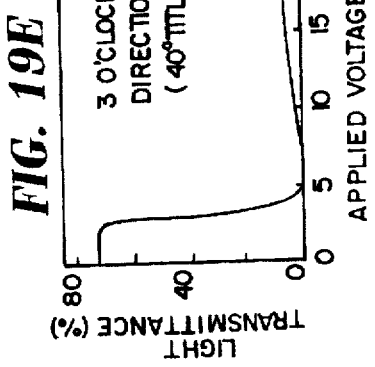
Figure 19E:
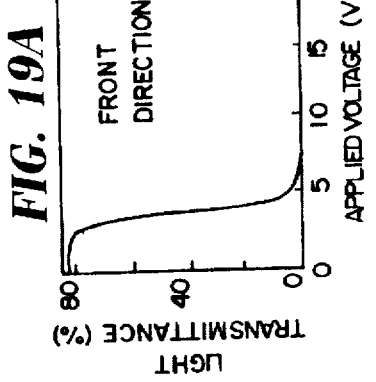
Figure 19D:
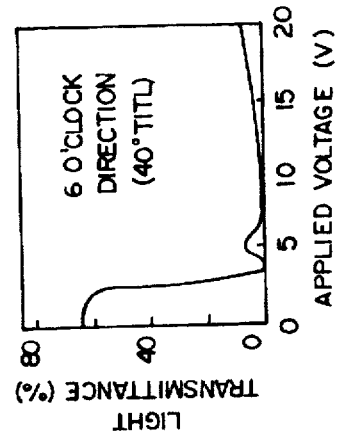
Figure 19F:
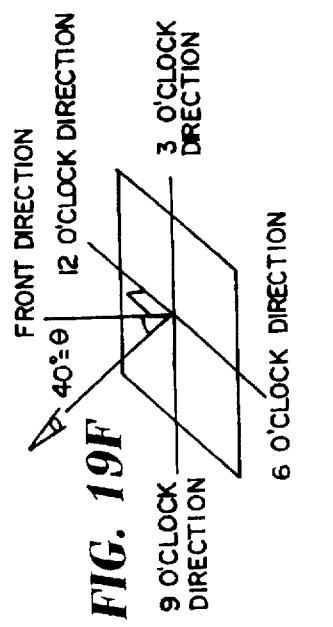
Figure 19C:
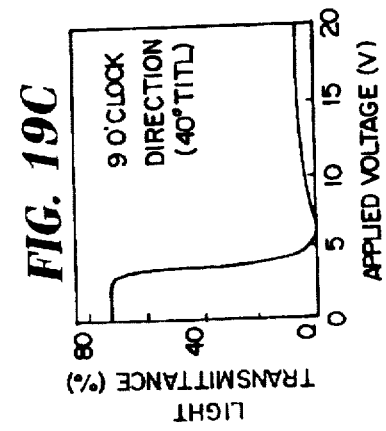

FIG. 16A is a sectional view of a substrate of this example, and FIG. 16B is a sectional view thereof taken on line A—A of FIG. 16A. A glass substrate 1 (with a thickness of 1.1 mm) bearing a transparent electrode 20 made of ITO (with a thickness of 50 nm) was subjected to the spin coating with OMR 83 (manufactured by Tokyo Oyo Kagaku) including 2 wt % of β-(perfluorooctyl)ethylacrylate and dried. Then, the substrate 1 was covered with a photomask and subjected to UV-ray irradiation. In this manner, the substrate 1 was provided with a resist 21 having a pattern as shown in FIG. 16A. The surface free energy of the transparent electrode 20 and that of the resist 21 were as listed in Table 2 below.

TABLE 2

| Surface Free Energy on Substrate: | | |
|---|---|---|
|  | On ITO electrode | On resist |
| Surface Free Energy ($\gamma_c$ (mN/m)) | 92.8 | 29 |

The surface free energy of liquid crystal material and a photopolymerizable material to be used in this example were as listed in Table 3 below.

TABLE 3

| Surface Free Energy of Liquid Crystal and Photopolymerizable Compound: | | |
|---|---|---|
|  | ZLI-4792 (incl. 0.4% S-811) | Photopolymerizable Compound |
| Surface free energy (mN/m) | 32 | 26 |

The substrates bearing the resist 21 and the transparent electrode 20 were attached to each other with a spacer having a diameter of 5.5 μm therebetween. Thus, a cell was produced. The following materials were mixed to obtain a mixture to be injected into the cell: 0.1 g of a compound 1 represented by Formula 3 below; 0.2 g of p-fluorostyrene; 0.2 g of β-(perfluorooctyl) ethylacrylate; 4.5 g of ZLI-4792 (manufactured by Merck & Co., Inc.) including 0.4 wt % of S-811 (a chiral agent) as a liquid crystal material and 0.025 g of Irgacure 651 as a polymerization initiator. Thus, the mixture including the components as listed in Table 4 was obtained.

Formula 3:

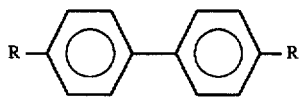

R: $CH_2=CHCOO(CH_2)_8-O-$

TABLE 4

| Components of the mixture used in Examples 2, 6 and 7 (wt %): | | | | |
|---|---|---|---|---|
|  | Compound 1 | β-(Perfluorooctyl) ethylacrylate | Octyl acrylate | p-fluoro styrene |
| Example 2 | 20 | 40 | 0 | 40 |
| Example 6 | 20 | 20 | 20 | 40 |
| Example 7 | 20 | 0 | 40 | 40 |

The obtained mixture was injected into the cell, and the cell was subjected to UV-ray irradiation by using a high pressure mercury lamp at 7 mW/cm² at a temperature of 100° C. through the formed pattern for 8 minutes, thereby polymerizing the photopolymerizable material. When the UV-ray irradiation was performed on the other side of the liquid crystal cell (i.e., on the surface bearing no pattern), the same effect was exhibited. Since the temperature of the substrate exceeds the isotropic temperature $T_{iso}$ of the liquid crystal material, the liquid crystal molecules are deposited not during the irradiation but in the subsequent annealing. After the UV-ray irradiation, the liquid crystal cell was slowly annealed from 100° C. to 30° C. over 12 hours while applying a voltage of ±2.5 V (square wave: 60 Hz).

Figure 17:
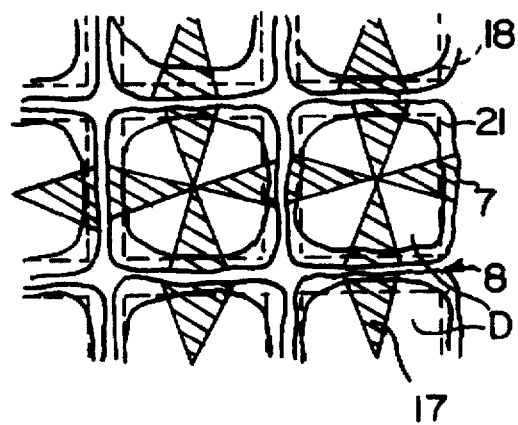
FIG. 17 is a plan view of a liquid crystal display device produced in Example 2 observed through a polarizing microscope.

The liquid crystal cell was observed with a polarizing microscope. As shown in FIG. 17, it was found that a liquid crystal domain D has the same regularity in the pattern as the dot pattern (i.e., the pattern of the pixels). Also, the observation found a schlieren texture 17, which is generally observed when the liquid crystal molecules in a liquid crystal domain D existing in approximately each of pixel regions 18 are oriented axisymmetrically or concentrically, and a dark ring in the vicinity of a polymeric wall 8, which was described with regard to FIG. 15. Although the liquid crystal cell was further observed while applying a voltage, a disclination line was not formed in response to the applied voltage.

A pair of polarizing plates were attached to the liquid crystal cell so that the polarization axes thereof cross at a right angle, thereby obtaining a liquid crystal display device in which the liquid crystal region 7 is surrounded by the polymeric walls 8. The substrates were peeled off from the liquid crystal cell in liquid nitrogen, and the liquid crystal material was washed with acetone. After drying, the polymeric material remained on the substrate was observed with a laser microscope. It was found that the polymeric material with a thickness of approximately 0.1 μm was attached within the liquid crystal region 7.

The electro-optical characteristics of the liquid crystal display device are listed in Table 5 together with those of display devices produced in the subsequent examples, and also shown in FIGS. 18A through 18F.

TABLE 5

| Display Characteristics: | | | | | | |
|---|---|---|---|---|---|---|
|  | Ex. 2 | Ex. 4 | Com. Ex. 6 | Ex. 6 | Ex. 7 | Ex. 10 |
| Light transmittance under no voltage applied (%) | 61 | 78 | 94 | 65 | 63 | 75 |

TABLE 5-continued

| | Display Characteristics: | | | | | |
|---|---|---|---|---|---|---|
| | Ex. 2 | Ex. 4 | Com. Ex. 6 | Ex. 6 | Ex. 7 | Ex. 10 |
| Light transmittance under 10 V voltage applied (%) | 0.6 | 2.1 | 0.1 or less | 0.8 | 1.4 | 0.6 |
| $V_{90}$ (V) | 5.3 | 5.5 | 4.3 | 5.9 | 6.5 | 5.4 |
| Reverse contrast viewing in intermediate display | ○ | ○ | X | ○ | ○ | ○ |

In Table 5, the liquid crystal display device in which the reverse contrast viewing was not observed is marked with ○; and one in which the reverse contrast viewing was observed with ease is marked with X. As the value of voltage to be applied becomes large, the light transmittance of the cell varies. $V_{90}$ is defined as a voltage where the light transmittance varies by 90% with respect to the whole amount of variation of the light transmittance.

The results shown in Table 5 and FIGS. 18A through 18F reveal that the reverse contrast viewing, which is observed in a TN cell of Comparative Example 5 described below (the electro-optical characteristics thereof are shown in FIGS. 19A through 19F), is not observed in the liquid crystal cell of this example, and that the light transmittance is not increased in wide viewing at the time of voltage saturation. These results were obtained assuming that the two polarizing plates having parallel polarization axes are blank (i.e., have 100% transmittance).

Comparative Example 4

Figure 20A:
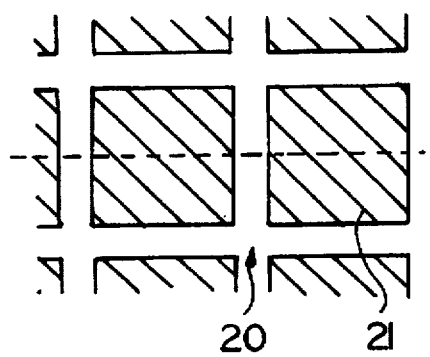
FIGS. 20A and 20S illustrate a resist pattern formed on a substrate produced in Comparative Example 4.
Figure 21:
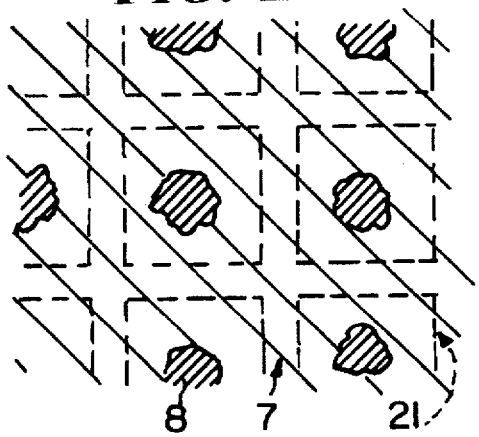
FIG. 21 is a plan view of a liquid crystal display device produced in Comparative Example 4 observed through a polarizing microscope.
Figure 20B:
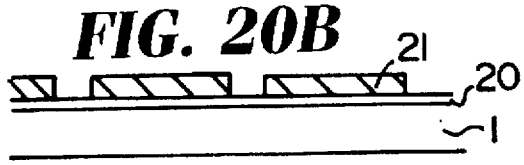

A pattern was formed on a substrate by using the surface free energy arrangement similarly to Example 2 using the same material but in the reverse pattern as shown in a plan view and a sectional view of FIGS. 20A and 20B. Such a substrate was made into a cell in the same manner as in Example 2, and a liquid crystal display device was produced under similar conditions to that in Example 2. The liquid crystal display device was observed under a polarizing microscope. It was found that polymeric walls 8 were formed around the center of a rectangular portion having smaller surface free energy so as to be surrounded by liquid crystal regions 7 as shown in FIG. 21. Based on Example 2 and Comparative Example 4, it is confirmed that, in using a pattern of the surface free energy arrangement, a photopolymerizable material having smaller surface free energy in the mixture is collected in an area having smaller surface free energy and the liquid crystal material having larger surface free energy in the mixture is collected in an area having larger surface free energy, thereby obtaining energetic stability.

Comparative Example 5

On a similar substrate to these in Example 2, an alignment film was formed by the spin coating with AL-4552 (manufactured by Japan Synthetic Rubber Co., Ltd.) and was sintered. The resultant substrate was subjected to a rubbing treatment using a nylon cloth. A pair of such substrates were attached to each other so that the orientation directions were vertical to each other in the same manner as in Example 2. The same liquid crystal material ZLI-4792 including 0.4 wt % of S-811 was injected into the cell, and a pair of polarizing plates were attached to the thus produced liquid crystal cell so that the polarization axes thereof cross at a Right angle. Thus, a conventional TN display device was produced.

The electro-optical characteristics of the liquid crystal display device are shown in FIGS. 19A through 19F.

EXAMPLE 3

Figure 22:
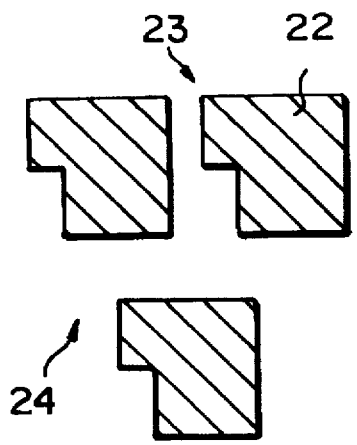
FIG. 22 is a plan view of a color filter used in Example 3.
Figure 23A:
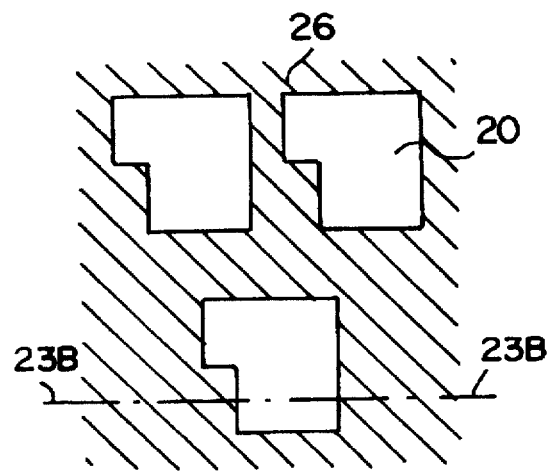
FIGS. 23A and 23B are a plan view and a sectional view of a TFT substrate used in Example 3.
Figure 23B:
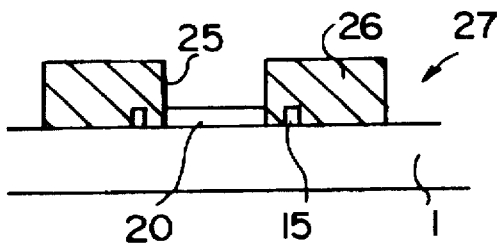

A counter substrate used in this example was provided with a color filter 24 having, as shown in FIG. 22, a matrix of a color filter portion 22 in the same shape as that of a pixel electrode 20 and a transparent portion 23 around the color filter portion 22. A TFT substrate 27 was provided with a black matrix 26 containing β-(perfluorooctyl) ethylacrylate on the surface thereof and having, as shown in FIGS. 23A and 23B, a hole 25 in the same shape as that of the pixel electrode 20 at a position corresponding to the pixel electrode 20. These two substrates were attached to each other so as to fabricate a cell with a thickness of 5.5 µm. The same type of a mixture as that used in Example 2 was injected into the cell and the UV-ray irradiation was performed through the color filter 24 in the cell.

The thus produced liquid crystal cell was observed under a polarizing microscope. Most of the pixels were occupied by a mono-domain liquid crystal region, in which the liquid crystal molecules were spirally oriented. A pair of polarizing plates were attached to the liquid crystal cell so that the polarization axes thereof cross at a right angle. Thus, a liquid crystal display device of this example was produced. The light transmittance of the liquid crystal display device under application of no voltage is shown in Table 5 above. The light transmittance was measured assuming that the cell sandwiched between the polarizing plates having parallel polarization axes (i.e., the cell before the injection of the liquid crystal material) is blank (i.e., have 100% light transmittance).

EXAMPLES 4 and 5

Liquid crystal cells of these examples have the same pattern as those formed in Examples 2 and 3 shown in FIGS. 16A and 16B. A mixture to be injected into a cell was obtained by mixing 0.1 g of R-684, 0.2 g of p-fluorostyrene, 0.2 g of β-(perfluorooctyl) ethylacrylate, 4.5 g of the liquid crystal material ZLI-4792 (manufactured by Merck & Co., Inc.) including 0.4 wt % of S-811, and 0.025 g of the photopolymerization initiator Irgacure 651. The mixture was injected into the same type of a liquid crystal cells as those produced in Examples 2 and 3 and the similar procedures were performed to produce liquid crystal display devices of Examples 4 and 5, respectively. The liquid crystal display device of Example 4 was observed under a polarizing microscope with an application of no voltage and also with a voltage.

In applying no voltage, a schlieren texture 17, which is generally observed when liquid crystal molecules in a liquid crystal domain D existing in approximately each pixel region 18 are oriented axisymmetrically or concentrically with respect to the center axis AX, was observed as shown in FIG. 24A.

In this liquid crystal display device, a disclination line 15 was formed in the vicinity of a polymeric wall 8 around a liquid crystal region 7 when a voltage was applied, as shown in FIG. 24B. When the liquid crystal display device of Example 5 was observed in the same manner, a disclination line 15 was hardly formed in the pixel region 18. It was confirmed that the disclination line 15 was concealed by the black matrix 26 shown in FIGS. 23A and 23B or no disclination line 15 was formed.

EXAMPLES 6 and 7

Liquid crystal display devices of Examples 6 and 7 were produced by using mixtures including the same type of liquid crystal material as that used in Example 2 and the photopolymerizable material including components listed in Table 4 above and the same type of cells as that produced in Example 2 under the same condition as in Example 2. By using the thus produced liquid crystal display devices, an effect obtained by using a monomer having a fluorine atom was measured. As a result, as shown in Table 5 above, the liquid crystal display devices including the monomer having a fluorine atom, i.e., the liquid crystal display devices of Example 2, 3, 6 and 10, exhibited excellent characteristics such that the driving voltage was decreased and the light transmittance under application of a saturated voltage was decreased.

Comparative Example 6

A cell was produced in the same manner as in Example 3, and the same type of a mixture as that used in Example 3 was injected into the cell. The liquid crystal cell was subjected to the UV-ray irradiation in the same manner as in Example 3 through a TFT substrate 27. A pair of polarizing plates were attached to the liquid crystal cell. Thus, a polymer dispersed liquid crystal display device was produced. The electro-optical characteristics of the liquid crystal display device are listed in Table 5 above. In the liquid crystal display device of this comparative example, the liquid crystal regions were formed in granular shapes, and the obtained display was rough as a whole.

EXAMPLE 8

(In the case where a thermosetting material is used)

A cell similar to that produced in Example 2 was used. A mixture containing 0.1 g of bisphenol A diglycidylate, 0.3 g of isobornyl acrylate, 0.1 g of β-(perfluorooctyl) ethylacrylate, 4.5 g of the liquid crystal material ZLI-4792 (manufactured by Merck & Co., Inc.) including 0.4 wt % of S-811, and 0.05 g of t-butyl peroxide as a polymerization initiator was injected into the cell. The resultant liquid crystal cell was heated at a temperature of 150° C. for 2 hours while applying a voltage of ±2.5 V (square wave: 60 Hz), and annealed slowly from 150° C. to 30° C. over 12 hours. The resultant liquid crystal cell was observed under a polarizing microscope to find the orientation of the liquid crystal molecules in the same state as in Example 2. A pair of polarizing plates were attached to the liquid crystal cell so that the polarization axes thereof cross at a right angle. The viewing angle characteristics of the thus produced liquid crystal display device were also excellent.

EXAMPLE 9

(In the case where the UV-ray irradiation is conducted after thermal phase-separation)

The used cell and the used mixture were the same as those used in Example 2. The liquid crystal cell was heated up to 100° C., thereby attaining the isotropic phase of the liquid crystal material. Then, the temperature was gradually decreased from 100° C., and the polymerizable material and the liquid crystal material were phase-separated at a temperature of 50° C. The resultant liquid crystal cell was subjected to the UV-ray irradiation by using a high pressure mercury lamp at 7 mW/cm$^2$ for 10 minutes to polymerize the polymerizable material. In this case, since the phase-separation between the liquid crystal material and the polymerizable material was conducted before the polymerization of the polymerizable material, the polymeric material was scarcely attached to the substrate within the liquid crystal region, resulting in the improved black level. Further, the holding ratio was as high as 97% (at a temperature of 25° C.) because the polymerization reaction is unlikely to be caused in the liquid crystal region.

The thus produced liquid crystal cell was observed under a polarizing microscope to find that the liquid crystal molecules were oriented in the same manner as in Example 2 and that the polymeric wall was regularly formed. Therefore, the obtained display was less rough.

A pair of polarizing plates were attached to the liquid crystal cell so that the polarization axes thereof cross at a right angle. The viewing angle characteristics of the thus produced liquid crystal display device were also excellent.

EXAMPLE 10

(In the case where a mixture of the compounds 1 and 2 is used)

A cell was produced in the same manner as in Example 2. As a mixture to be injected into the cell, 0.25 g of the compound 1 represented by Formula 3, 0.175 g of a compound 2 represented by the following Formula 4, 0.2 g of p-fluorostyrene, 0.15 g of β-(perfluorooctyl)ethylacrylate, 4.5 g of the liquid crystal material ZLI-4792 (manufactured by Merck & Co., Inc.) including 0.4 wt % of S-811, and 0.025 g of the polymerization initiator Irgacure 651 were homogeneously mixed.

Formula 4:

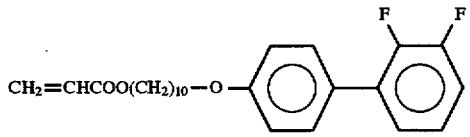

The obtained mixture was injected into the cell, and the isotropic phase of the mixture was attained in the same manner as in Example 9. The temperature was gradually decreased to deposit the liquid crystal material, and then the UV-ray irradiation was conducted for the polymerization.

The thus produced liquid crystal cell was observed under a polarizing microscope to find the structure as shown in FIGS. 24A and 24B. The peripheral ring, which was observed in the liquid crystal cell produced in Example 2, was not observed in this example. The presence of such a ring indicates that the liquid crystal molecules are oriented axisymmetrically with respect to the central axis of the pixel region. When the liquid crystal display device was further observed while applying a voltage, no disclination line was formed. A pair of polarizing plates were attached to the liquid crystal cell so that the polarization axes thereof cross at a right angle. The viewing angle characteristics of the thus produced liquid crystal display device were also excellent.

EXAMPLES 11, 12, 13 AND COMPARATIVE EXAMPLE 7

(Material for a resist on a substrate)

Liquid crystal cells produced in these examples and comparative example have a resist pattern as shown in FIG. 16. A glass substrate 1 with a thickness of 1.1 mm bearing a transparent electrode 20 made of ITO (with a thickness of 50 nm) was subjected to the spin coating with OMR 83 (manufactured by Tokyo Oyo Kagaku), and dried. The resulting substrate was covered with a photomask and subjected to the UV-ray irradiation through the photomask. Thus, the substrate bearing a resist 21 in the same pattern as that formed in Example 2 was produced as Example 11. A substrate of Example 12 was produced in the same manner except that 4 wt % of -(perfluorooctyl) ethylacrylate was contained in OMR 83. A substrate of Example 13 was also produced in the same manner except that OFPR 800 (manufactured by Tokyo Oyo Kagaku) was used instead of OMR 83. A substrate of Comparative Example 7 was produced in the same manner except that OFPR 800 (Manufactured by Tokyo Oyo Kagaku) including 2 wt % of epoxy ester 3002 M (manufactured by Kyoeisha Yushi Kagaku) was used instead of OMR 83. The surface free energy of the resists formed with the respective materials are listed in Table 6 below. The surface free energy of the ITO used in these examples was 92.8 mN/m. By using the respective substrates, cells were produced in the same manner as in Example 2. The same type of mixture as that used in Example 2 was injected into each cell. Thus, liquid crystal-polymer complex display devices were produced.

TABLE 6

Surface free energy on the resist material:

|  | Example 11 | Example 12 | Example 13 | Comparative Example 7 |
|---|---|---|---|---|
| Surface free Energy (mN/m) | 33.1 | 30.1 | 65.1 | 78.2 |

Note: The surface free energy of ITO is 92.8 mN/m.

The observation of the liquid crystal cells produced in Examples 2 and 11 through 13 found that the polymeric wall was formed on the resist 21 in all the cells. When the difference in the surface free energy is larger, however, the regularity of the polymeric wall was improved and the roughness of the obtained display was decreased. Particularly, in Comparative Example 7, where a difference in the surface free energy between the resist and the transparent electrode is 14.6 mN/m, the polymeric wall has little regularity. Therefore, the resist material used in Comparative Example 7 has poor controllability for forming a liquid crystal region within each pixel.

A pair of polarizing plates were attached to each liquid crystal cell so that the polarization axes thereof cross at a right angle. The viewing angle characteristics of the thus produced liquid crystal display devices were excellent.

EXAMPLE 14

(In the case where the patterns are formed on both the substrates)

A cell produced in this example has a resist pattern as shown in FIG. 16. The same type of substrates as that produced in Example 2 bearing a pattern with a arrangement of surface free energy was used in this example. A pair of such substrates were attached to each other so that the pattern formed with the resist 21 on one substrate was matched with the pattern on the other substrate. The same type of a mixture as that used in Example 9 was injected into the thus produced cell, and the phase-separation between the liquid crystal material and the polymeric material was conducted in the same manner as in Example 9. The thus produced cell was observed with a polarizing microscope to find the formation of an almost perfectly patterned polymeric walls.

A pair of polarizing plates were attached to the liquid crystal cell so that the polarization axes hereof cross at a right angle. The viewing angle characteristics of the thus produced liquid crystal display device were excellent.

EXAMPLES 15, 16, 17 AND COMPARATIVE EXAMPLE 8

(Cell gap)

By using the same type of materials as those used in Comparative Example 7, four kinds of substrates each bearing a similar pattern to that formed in Comparative Example 7 were produced as Examples 15, 16, 17 and Comparative Example 8. The difference between these four substrates is in the thickness of the respective regions formed thereon as shown in Table 7 below. By using the respective substrates, liquid crystal cells were produced in the same manner as in Comparative Example 7. Each of the liquid crystal cells was observed under a polarizing microscope to find the following: In the liquid crystal cells of Examples 15 through 17, polymeric walls were regularly formed; and in the liquid crystal cell of Comparative Example 8, a number of bubbles remained because the cell gap was so small that a sufficient amount of the mixture did not enter the liquid crystal cell.

TABLE 7

|  | Comparative Example 7 | Example 15 | Example 16 | Example 17 | Comparative Example 8 |
|---|---|---|---|---|---|
| Thickness of resist (μm) | 0.17 | 0.83 | 2.97 | 4.73 | 5.22 |
| Thickness A of cell above the resist (μm) | 5.33 | 4.68 | 2.53 | 0.77 | 0.28 |
| A/thickness of cell above ITO | 0.03 | 0.15 | 0.54 | 0.86 | 0.95 |
| Phase-separation | Random | Good | Good | Good | Many Bubbles |

EXAMPLE 18

(Polymer matrix STN)

A cell produced in this example has the same resist pattern as that shown in FIG. 18. A glass substrate with a thickness of 1.1 mm bearing a transparent electrode 20 made of ITO (with a thickness of 50 nm) was coated with a polyimide alignment film (Sansha 150; manufactured by Nissan Kagaku). The resultant substrate is subjected to the spin coating with OMR 83 including 2 wt % of β-(perfluorooctyl) ethylacrylate, and dried. The substrate was covered with a photomask and subjected to UV-ray irradiation. Thus, a resist 21 was formed on the substrate in the same pattern as that in Example 2. The resultant substrate was subjected to a rubbing treatment in one direction. Another glass substrate, i.e., a counter substrate, also bearing the transparent electrode 20 was coated with the polyimide alignment film alone, and subjected to the rubbing treatment. These substrates were attached to each other with a spacer therebetween so that the resultant cell thickness be 9 μm and that the rubbing direction in the rubbing treatment cross at an angle of 240°, thereby producing a cell for STN. A mixture including 0.2 g of R684 (manufactured by Nippon Kayaku Co., Ltd.), 0.1 g of p-phenylstyrene, 0.1 g of stearyl acrylate, 0.6 of the compound 2 represented by Formula 4, 4 g of the liquid crystal material ZLI-4427 (Manufactured by Merck & Co., Inc.; wherein twist angle was previously adjusted to be 240° by adding S-811) and 0.025 g of the photopolymerization initiator Irgacure 651 was injected into the cell. Then, the photopolymerization was caused in the same manner as in Example 9.

The thus produced liquid crystal cell was observed under a polarizing microscope to find that, as shown in FIG. 25, an STN oriented liquid crystal region 7 was formed at an area approximately corresponding to each of the resists 21 and polymeric walls 8 were formed in a pattern so as to surround the liquid crystal region 7. The characteristics of the liquid crystal cell are shown in Table 8 below. A liquid crystal display device produced by using this liquid crystal cell exhibited display characteristics equal to those of the device using the ordinary STN liquid crystal cell produced in Comparative Example 9, and the displayed image was little changed by pressing the liquid crystal cell with a sharp instrument such as a pen.

TABLE 8

Display characteristics of polymer matrix STN:

|  | Contrast | Response rate (ms) | Display state when pressed with a pen |
| --- | --- | --- | --- |
| Example 18 | 9 | 298 | not changed |
| Comparative Example 9 | 10 | 250 | changed |

Comparative Example 9

By using the same type of a substrate as used in Example 18 bearing neither the resist 21 nor the surface free energy arrangement, an ordinary STN oriented liquid crystal cell was produced. The used liquid crystal material was the same type as that used in Example 18. The contrast, the response rate and the change in the display when the display area was pressed with a pen are listed in Table 8 above. Since the resist 21 is not formed in the liquid crystal cell of this comparative example, the transformation of the substrate caused by the pressure with a pen affects the display state.

EXAMPLE 19

(In the case where the surface free energy of the liquid crystal material and the polymerizable material are reversed)

The same type of a substrate bearing an ITO electrode 20 as that used in Example 3 was coated with OMR 83 (manufactured by Tokyo Oyo Kagaku) by the spin coating, and subjected to exposure/development by using a photomask. The used photomask was similar to the color filter 24 used in Example 3 and shown in FIG. 22 except that the positions of the color filter portion 22 and the transparent portion 23 were reversed. Therefore, the thus produced substrate had a reverse resist pattern as compared with the resist pattern shown in FIG. 23A. The thus produced substrate and a counter substrate bearing the ITO electrode 20 were attached to each other with a spacer having a diameter of 5.5 µm therebetween to produce a cell. A mixture including 0.04 g of R684, 0.2 g of p-fluorostyrene, 4.4 g of the liquid crystal material ZLI-4792 (manufactured by Merck & Co., Inc.) including 0.4 wt % of S-811, 0.025 g of the polymerization initiator Irgacure 651 was injected into the cell, and the polymerization was caused. The surface free energy of the polymerizable material was 39.2 mN/m, which was larger than that of the liquid crystal material, that is, 32 mN/m. A polymeric wall and a liquid crystal region were formed in a reverse pattern of those formed in Example 3.

By using the thus produced liquid crystal cell, a liquid crystal display device was produced in the same manner as in Example 2. The liquid crystal display device was observed with a polarizing macroscope to find that the polymeric material and the liquid crystal material were collected on the ITO electrode 22 and the resist 21, respectively.

Even when the surface free energy of the liquid crystal material and the polymerizable material were the reverse of those of Example 2 as in this example, the polymeric wall and the liquid crystal region can be intentionally positioned by providing adequate arrangement of the surface free energy on the substrate.

EXAMPLE 20

On a sufficiently washed glass substrate (#7059; manufactured by Corning Co., Ltd.) with a thickness of 1.1 mm, ITO was evaporated as a transparent electrode into a thickness of 100 nm. The substrate bearing the IT was subjected to the spin coating of a photo resist, an exposing/developing process with UV rays, etching of the ITO, and peeling of the resist in this order. In this manner, striped electrodes with a pitch of 100 µm, the width of 80 µm, and the interval therebetween of 20 µm were formed on the substrate. A pair of such substrates were attached to each other with a spacer having a diameter of 5 µm therebetween so that the surfaces bearing the electrodes face each other and that the striped electrodes cross at a right angle, thereby producing a cell.

The mixture injected into this liquid crystal cell includes 90 wt % of the liquid crystal material ZLI-4792 (manufactured by Merck & Co., Inc.), 4 wt % of isobornyl methacrylate, 4 wt % of isobornyl acrylate, 1.5 wt % of p-phenyl styrene, 0.25 wt % of the polymerization initiator Irgacure 651, and 0.2 wt % of S-811. The components were homogeneously mixed, and the homogeneous mixture was injected into the cell by the vacuum injection, while retaining a condition where the mixture was not exposed to UV rays.

Figure 26:
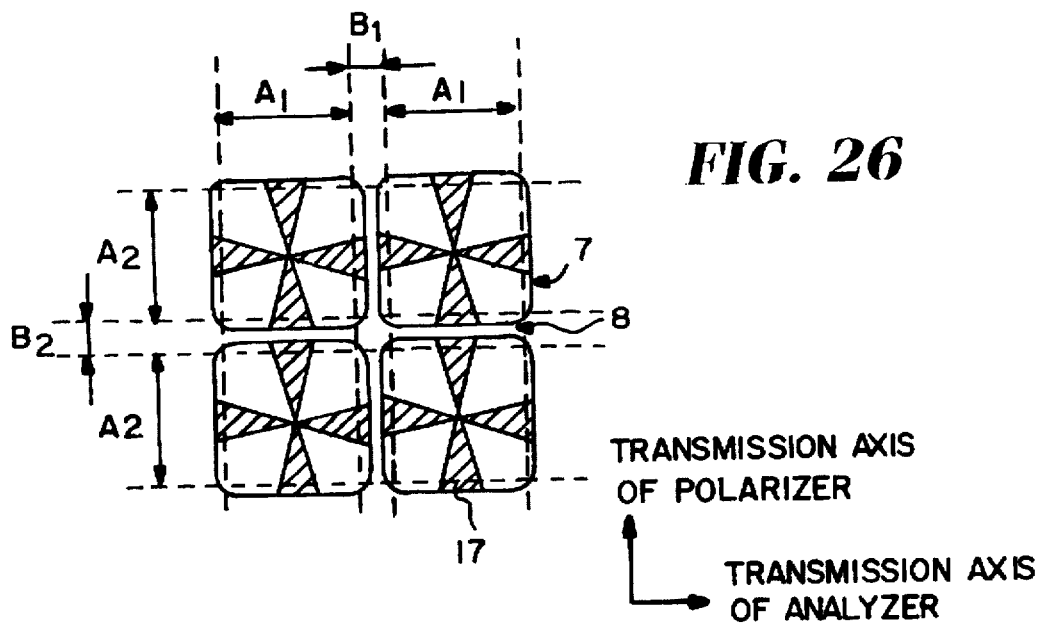
FIG. 26 is a plan view of a liquid crystal display device produced in Example 20 observed through a polarizing microscope.

Then, the thus produced liquid crystal cell was further processed so that a voltage can be externally applied to the electrodes in the liquid crystal cell. The liquid crystal cell was heated to a temperature of 100° C. in a thermostat, and after maintaining the temperature for 1 hour, a voltage of ±5 V (square wave: 60 Hz) was applied to the electrodes on both substrates. The liquid crystal cell was then annealed to a temperature of 74° C., while applying this voltage. It was previously confirmed that the mixture was separated into the liquid crystal phase and the isotropic phase of the polymeric material at this temperature. Further, while maintaining the applied voltage and this temperature, the liquid crystal cell was irradiated with UV rays by using a high pressure mercury lamp at 7 mW/cm$^2$ (365 nm) for 10 minutes. Thus, the separated liquid crystal phase and isotropic phase were fixed as a liquid crystal region and a polymeric wall. Then, the application of the voltage was stopped, and a polarizer and an analyzer were attaches to the respective outside surfaces of the substrates so that the transmittance axes thereof cross at a right angle. Thus, a liquid crystal display device was produced. The result of the observation of this liquid crystal display device under a polarizing microscope is shown in FIG. 26. The comparison of the observation results between this liquid crystal display device of Example 20 and a liquid crystal display device of Comparative Example 10 described below are listed in Table 9 below.

In FIG. 26, the striped electrodes are indicated with $A_1$ and $A_2$, and the intervals between the electrodes, i.e., nonelectrode portions, are indicated with $B_1$ and $B_2$. As is shown in FIG. 26, the liquid crystal region 7 is well controlled to be formed in an area where an electric field is applied, and the polymeric wall 8 is also well controlled to be formed in the non-electrode portion. A schlieren texture 17 was found in each liquid crystal region 7. The cross portions of the schlieren texture 17 are, however, parallel to the transmittance axes of the polarizer and the analyzer. Therefore, the schlieren texture 17 does not cause quality degradation of the liquid crystal display device.

This liquid crystal display device exhibited excellent display characteristics, its viewing angle characteristics were superior to those of a conventional TN liquid crystal display device, and no reverse contrast was caused. The visual observation could find no irregularity in the light transmittance, and no roughness was found when visually observed at a distance of 10 cm from the liquid crystal cell.

TABLE 9

Comparison between the liquid crystal display devices of Example 20 and Comparative Example 10:

|  | Example 20 | Comparative Example 10 |
| --- | --- | --- |
| Roughness (at a distance of 10 cm from the device) | None | Found |
| Roughness (at a distance of 30 cm from the device) | None | Found (less than observed at a distance of 10 cm) |

Comparative Example 10

Similarly to Example 20, a cell was produced and processed so that a voltage could be applied to the electrodes therein. Then, the electrodes were short-circuited so as not to be applied with a voltage. The same type of mixture as that used in Example 20 was injected by the vacuum injection into the cell, which was then heated to a temperature of 100° C. in a thermostat. The temperature was maintained for 1 hour. Then, the liquid crystal cell was annealed to a temperature of 74° C. While maintaining this temperature, the liquid crystal cell was subjected to the UV-ray irradiation by using a high pressure mercury lamp at 7 mW/cm² (wavelength: 365 nm) for 10 minutes, thereby fixing the phase-separated liquid crystal phase and isotropic phase as a liquid crystal region and a polymeric wall. A pair of polarizing films were attached to both surfaces of the liquid crystal cell so that the transmittance axes thereof cross at a right angle. Thus, a liquid crystal display device was produced.

Figure 27:
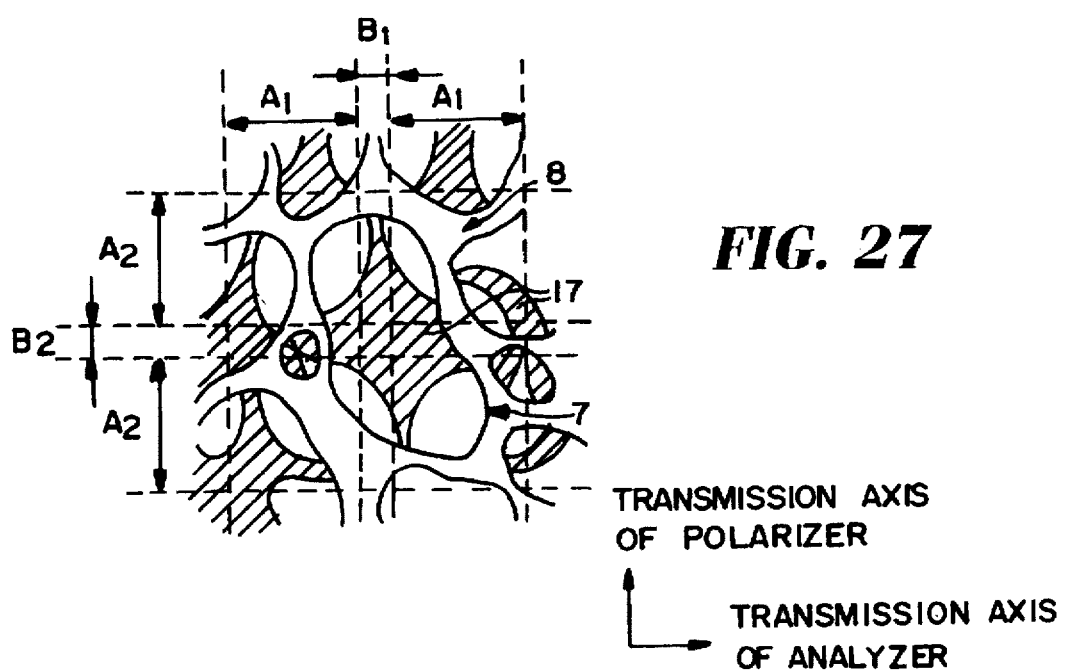
FIG. 27 is a plan view of a liquid crystal display device produced in Comparative Example 10 observed through a polarizing microscope.

The result of the observation of this liquid crystal display device under a polarizing microscope are shown in FIG. 27. The electrodes and the nonelectrode portions are indicated similarly to FIG. 26. As is shown in FIG. 27, the position and the shape of each liquid crystal region are not sufficiently controlled as they are in Example 20, and the respective liquid crystal regions have different sizes.

This liquid crystal display device also exhibited excellent display characteristics, its viewing angle characteristics were superior to those of a conventional TN liquid crystal display device, and no reverse contrast was caused. The visual observation, however, found irregularities in the light transmittance as shown in Table 9 above, and the roughness could be observed even at a distance of 30 cm from the liquid crystal cell.

EXAMPLE 21

A substrate was produced in the same manner as in Example 20, and the surface thereof bearing the electrode was subjected to the spin coating with a polyimide alignment film and the rubbing treatment. A pair of such substrates were attached to each other with a spacer therebetween in the same manner as in Example 20. The spacer used in this example had a diameter of 6.5 µm instead of 5 µm. A mixture obtained by homogeneously mixing 85 wt % of the liquid crystal material ZLI-4427 including S-811, 6 wt % of isobornyl acrylate, 6 wt % of R-684, 2.5 wt % of styrene and 0.5 wt % of the polymerization initiator Irgacure 651 was injected into the thus produced cell by the vacuum injection.

As the liquid crystal material used in this example, the ZLI-4427 was mixed with S-811 so as to adjust the relationship between a chiral pitch p and a cell gap d to be d/p=0.5. Then, the liquid crystal cell was heated to a temperature of 100° C. in a thermostat, and the temperature was maintained for 1 hour. A voltage of ±5 V (square wave: 60 Hz) was then applied to the electrode on each substrate. While maintaining this applied voltage, the liquid crystal cell was annealed to a temperature of 71° C. It was previously confirmed that the mixture was phase-separated into the liquid crystal phase and the isotropic phase at this temperature. While keeping this temperature and the applied voltage, the liquid crystal cell was subjected to the UV-ray irradiation by using a high pressure mercury lamp at 7 mW/cm² (365 nm) for 8 minutes, thereby fixing the separated liquid crystal phase and isotropic phase as a liquid crystal region and a polymeric wall. Then, the application of the voltage was stopped, and a polarizer and an analyzer were attached to the respective surfaces of the liquid crystal cell. Thus, a liquid crystal display device was produced.

Figure 29:
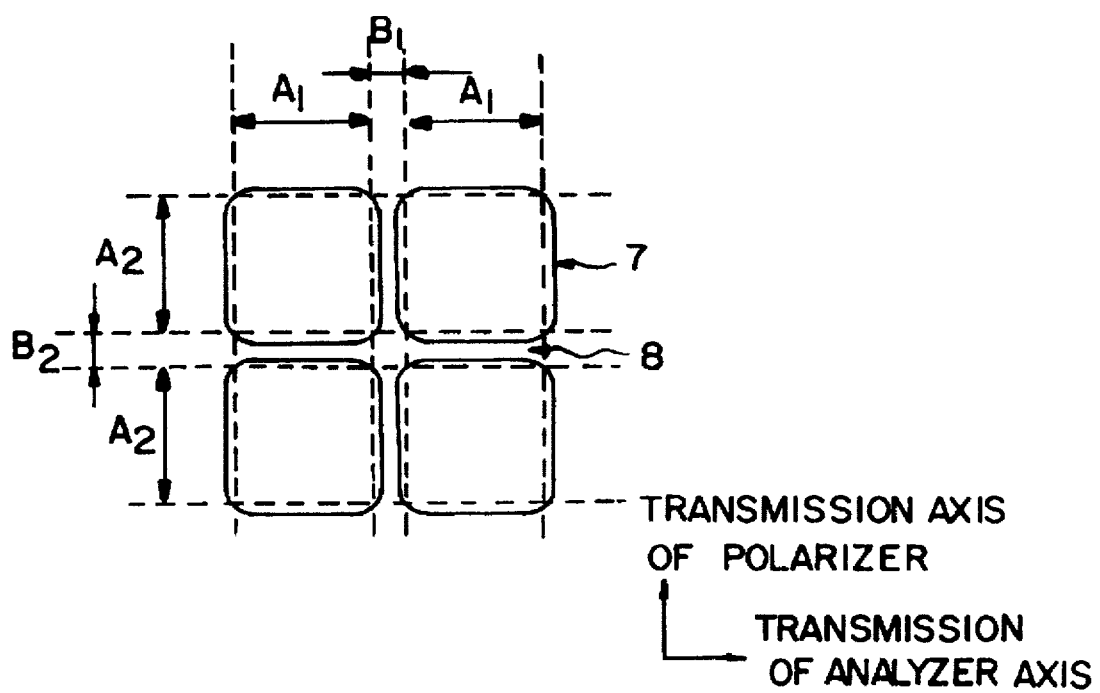
FIG. 29 is a plan view of a liquid crystal display device produced in Example 21 observed through a polarizing microscope.

The result of the observation of this liquid crystal display device under a polarizing microscope is shown in FIG. 29. The optical characteristics of the liquid crystal region were equal to those of a conventional STN liquid crystal display device. The electrodes and the non-electrode portions are indicated similarly to FIG. 26. Also in this example, the liquid crystal regions are well controlled so as to be formed in an area where an electric field is applied. In this example, a schlieren texture, which was observed as shown in FIG. 27, was not formed.

In the liquid crystal display device of this example, no change of the displayed image in color and the like was observed when a pressure was applied to the device, while the displayed image is changed in a conventional liquid crystal display device. Further, neither irregularity nor roughness was observed in the display.

EXAMPLE 22

A glass substrate bearing a TFT (a thin film transistor) used for the active matrix drive and a counter substrate bearing an alignment film were used to produce a cell. The alignment film disposed nearest to the liquid crystal material was not subjected to the rubbing treatment differently from a conventional liquid crystal display device using a TFT. The liquid crystal cell was provided with a terminal electrode so that a voltage could be applied to a transparent electrode, and the same type of a mixture as that used in Example 20 was injected into the liquid crystal cell by the vacuum injection. The thus produced liquid crystal cell was heated to a temperature of 100° C. in a thermostat, and the temperature was maintained for 1 hour. A voltage of ±5 V (square wave: 60 Hz) was applied through the TFT to the electrodes on both the substrates. While maintaining the applied voltage, the liquid crystal cell was annealed to a temperature of 74° C. While maintaining the temperature and the applied voltage, the liquid crystal cell was subjected to the UV-ray irradiation by using a high pressure mercury lamp at 7 mW/cm² (365 nm) for 20 minutes, thereby fixing the separated liquid crystal phase and isotropic phase as the liquid crystal region and the polymeric wall.

The UV-ray irradiation was conducted for a longer time than in Example 20 because the liquid crystal cell was irradiated through the substrate bearing the TFT and the irradiating UV rays was decreased by the driving wiring between the electrodes.

Figure 28:
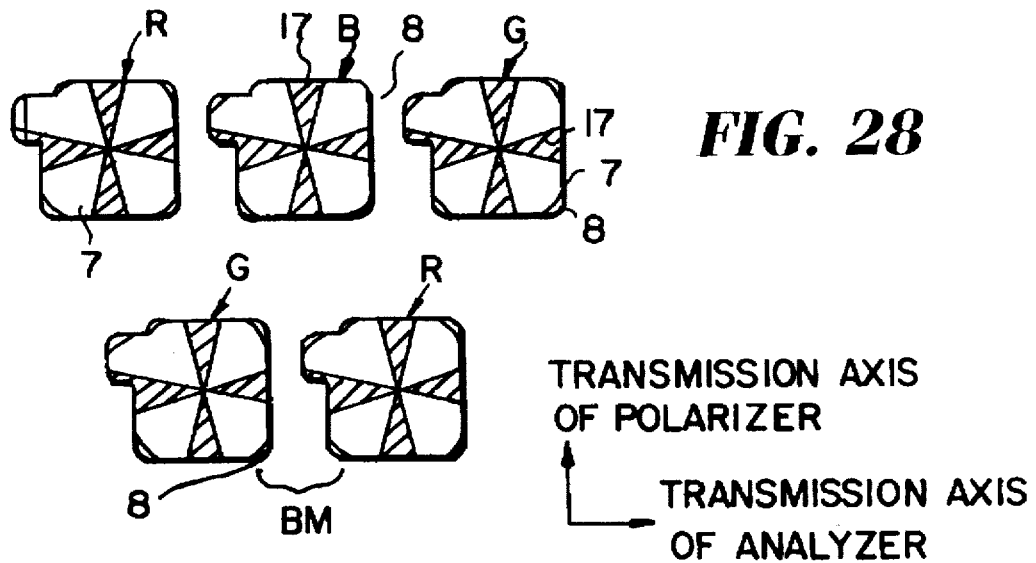
FIG. 28 is a plan view of a liquid crystal display device produced in Example 22 observed through a polarizing microscope.

Then, the application of the voltage was stopped, and a polarizing film and an analyzing film were attached to both the surfaces of the liquid crystal cell so that the transmittance axes thereof cross at a right angle. In this manner, a liquid crystal display device was produced. The result of the observation of the liquid crystal display device under a polarizing microscope is shown in FIG. 28. As shown in FIG. 28, the position and the shape of a liquid crystal region 7 were well controlled to be adjusted to those of a pixel. A polymeric wall 8 was scarcely formed within a pixel contributing to the display.

This liquid crystal display device also exhibited excellent display characteristics, its viewing angle characteristics were superior to those of a conventional TN liquid crystal display device, and no reverse contrast was caused. Further, the visual observation found no irregularity in the light transmittance, and no roughness was visually observed at a distance of 10 cm from the liquid crystal cell.

EXAMPLE 23

Figure 30:
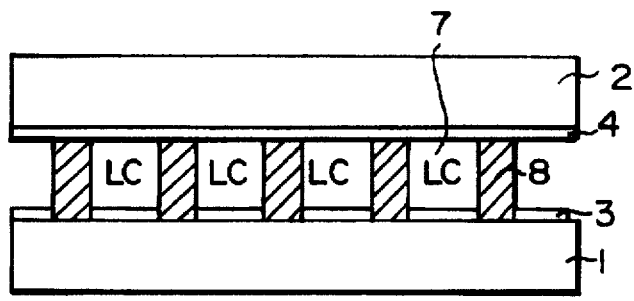
FIG. 30 is a sectional view of a liquid crystal display device produced in Example 23.

FIG. 30 is a sectional view of a liquid crystal display device of this example. As shown in FIG. 30, the liquid crystal display device includes a pair of substrates 1 and 2 made from a glass or the like and opposing each other, and a liquid crystal region 7 and surrounded by polymeric walls 8, which work together as a display medium, sandwiched between the substrates 1 and 2. The substrate 1 is provided with wiring as an ITO electrode 3 on the inner surface, and the substrate 2 is provided with wiring as an ITO electrode 4 on the inner surface. A portion where the electrode 3 opposes the electrode 4 works as a pixel.

The production method for this liquid crystal display device will now be described.

Figure 31:
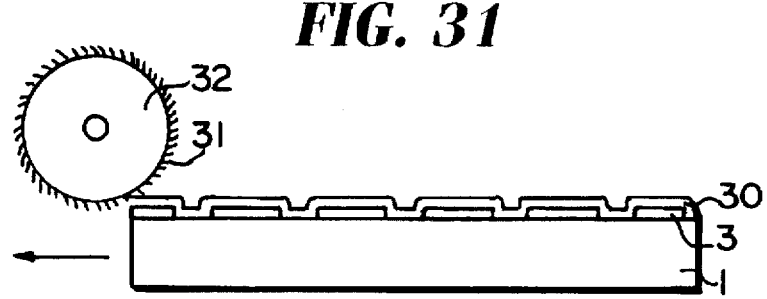
FIG. 31 is a sectional view of the liquid crystal display device of Example 23 during a rubbing treatment.

The ITO electrodes 3 and 4 are formed on one of the surfaces of the substrates 1 and 2, respectively, in a striped shape so as to have a thickness of 200 nm. Then, an alignment film is formed thereon by, for example, coating the substrate with SE-150 (manufactured by Nissan Kagaku) by the spin coating into a thickness of 50 nm and then sintering it. Finally, the surface of the alignment film is subjected to the rubbing treatment in one direction using a nylon cloth. At this point, the touch and the contact pressure of the pile of the rubbing cloth against the electrode are different from those against the non-electrode portion. Specifically, as shown in FIG. 31, when a rubbing roller 32 covered with a rubbing cloth 31 are rotated and the substrate 1 bearing the electrode 3 and the alignment film 30 are simultaneously moved in the direction shown by an arrow, the pile of the rubbing cloth 31 applies a larger pressure to the electrode than to the non-electrode portion. Therefore, the resultant surfaces of the alignment film 30 on the electrode and the non-electrode are different. After the rubbing treatment, the substrates 1 and 2 are attached to each other with a spacer therebetween so that the electrodes 3 and 4 oppose each other. A mixture of a liquid crystal material, a photopolymerizable or thermosetting material and a polymerization initiator is injected into the thus obtained liquid crystal cell. In this example, the following materials are used for preparing the mixture: 0.612 g of the liquid crystal material ZLI-4792 (manufactured by Merck & Co., Inc.); 0.03 g of isobornyl acrylate, 0.03 g of β-(perfluorooctyl) ethylacrylate and 0.008 g of p-phenyl styrene as photopolymerizable materials; and 0.003 g of the photopolymerization initiator Irgacure 651 (manufacture by CIBA-GEIGY Corporation).

Figure 32:
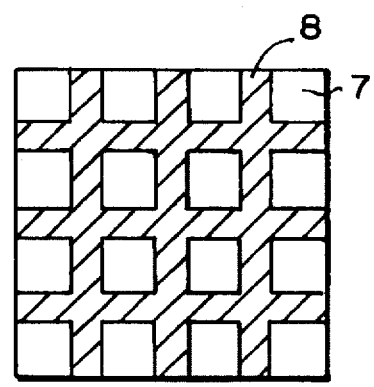
FIG. 32 is a plan view of a liquid crystal display device of Example 23 observed with a polarizing microscope.

The thus produced cell is heated to a temperature of 95° C., where the liquid crystal material is in the isotropic phase, and the temperature is maintained. Then, the UV-ray irradiation is conducted, for example, at 10 mW/cm² for 10 minutes. The cell is then annealed to room temperature at a rate of approximately −0.2° C./min. This annealing in the isotropic phase collects the polymerizable material in a non-electrode portion. Then, the liquid crystal cell is subjected to UV-ray irradiation again at 10 mW/cm² for 10 minutes. The thus produced liquid crystal cell was observed under a polarizing microscope to find that the polymeric wall 8 is formed in the non-electrode portion as shown in FIG. 32. The miscible temperature $T_{N-I}$ of the liquid crystal region 7 is 86° C., while that of the liquid crystal alone is 90° C. This reveals that the pixel is approximately occupied by the liquid crystal material and that the liquid crystal material and the polymerizable material were definitely phase-separated.

EXAMPLE 24

Figure 33:
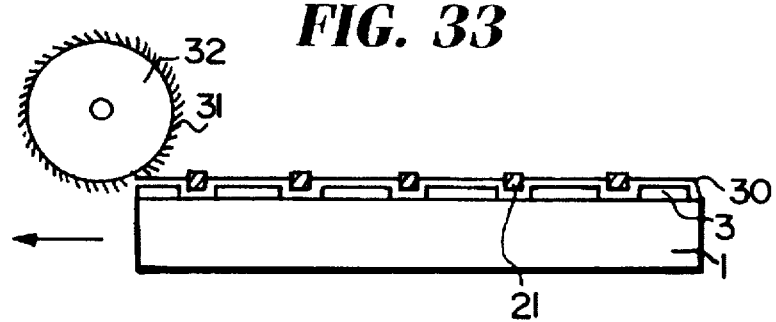
FIG. 33 is a sectional view of a liquid crystal display device of Example 24 during a rubbing treatment.

FIG. 33 is a sectional view of a liquid crystal display device of this example during the rubbing treatment. As shown in FIG. 33, a wiring is provided on the surface of a substrate 1 made of glass or the like as an electrode 3 and an alignment film 30 is formed thereon. A resist 21 is further formed in a concave corresponding to an interval between the electrodes 3 in the alignment film 30. A counter substrate has a similar structure, and a portion where the respective electrodes oppose when the two substrates are attached to each other works as a pixel.

The production method for the liquid crystal display device of this example will now be described.

An ITO electrode 3 is formed on each of a pair of substrates in a striped shape. An alignment film 30 is formed on the electrode 3 with SE-150 (manufactured by Nissan Kagaku) into a thickness of approximately 50 nm. Then, in a concave formed between the electrodes 3 in the alignment film 30, a positive photo resist 21 is formed by using OFPR-800 (manufactured by Tokyo Oyo Kagaku) by a photolithographic treatment into a thickness of approximately 50 nm. Then, the surface of the substrate bearing the alignment film 30 and the resist 21 is subjected to the rubbing treatment using a nylon cloth or the like. The resist 21 can be peeled off during the rubbing treatment. The thus obtained substrate is attached to a counter substrate produced in the same manner with a spacer therebetween.

A mixture of a liquid crystal material, a photopolymerizable or thermosetting material and a polymerization initiator is injected into the thus produced cell. The mixture used in this example includes 0.612 g of the liquid crystal material ZLI-4792 (manufactured by Merck & Co., Inc.); 0.03 g of isobornyl acrylate, 0.03 g of β-(perfluorooctyl) ethylacrylate and 0.008 g of p-phenyl styrene as photopolymerizable materials; and 0.003 g of the polymerization initiator Irgacure 651 (manufactured by CIBA-GEIGY Corporation). The resultant liquid crystal cell is heated to a temperature of 95° C., where the liquid crystal material is in the isotropic phase, and the temperature is maintained.

The liquid crystal cell is then subjected to the UV-ray irradiation at 10 mW/cm² for approximately 10 minutes. The liquid crystal cell is then annealed to room temperature at a rate of approximately −0.2° C./min. This annealing in the isotropic phase collects the polymerizable material in the non-pixel portion. Then, the UV-ray irradiation is conducted at 10 mW/cm² for 10 minutes at room temperature, thereby further polymerizing the polymerizable material. The thus produced liquid crystal cell is observed under a polarizing microscope to find that the polymeric wall is formed in the non-pixel portion as shown in FIG. 32. The miscible temperature $T_{N-I}$ of the liquid crystal region is 86° C., while that of the liquid crystal material alone is 90° C. This reveals That the pixel is approximately occupied by the liquid crystal material and that the liquid crystal material and the polymerizable material are definitely phase-separated.

EXAMPLE 25

In this example, five kinds of photopolymerizable materials, a through e, were prepared as listed in Table 10 below. The surface free energy of the respective materials were also listed in Table 10. A mixture including 1 g of one of the photopolymerizable compounds, 4 g of a liquid crystal material E-7 (manufactured by Merck Inc., Co.) including 0.4 wt % of S-811, and 0.025 g of the photopolymerization initiator Irgacure 184 (manufactured by CIBA-GEIGY Corporation) was injected into a cell produced in the same manner as in Example 2. The resultant liquid crystal cells were subjected to the UV-ray irradiation by using a high pressure mercury lamp at 7 mW/cm² 8 minutes, thereby polymerizing the photopolymerizable material. A large amount of the polymeric materials was found to have entered a pixel in the liquid crystal cells in the case of using the photopolymerizable materials a and b, while in The case of using the photopolymerizable materials c, d and e, polymeric materials were not found in the resultant liquid crystal cells.

TABLE 10

| | Components and surface free energy of the photopolymerizable materials (wt %): | | | |
|---|---|---|---|---|
| | Surface free energy (mN/m) | DPCA-30 | Perfluoro-octylethyl acrylate | p-fluoro-styrene |
| a | 41.2 | 100% | 0% | 0% |
| b | 40.2 | 95% | 0% | 5% |
| c | 36.8 | 80% | 10% | 10% |
| d | 30.5 | 60% | 20% | 20% |
| e | 25.3% | 40% | 30% | 30% |

Note: DPCA-30 is a photopolymerizable material manufactured by Nippon Kayaku Co., Ltd.

EXAMPLE 26

A mixture including 1 g of one of the photopolymerizable materials a through e listed in Table 10, 4 g of the liquid crystal material E-7 (manufactured by Merck Inc., Co.) including 0.4 wt % of S-811 and 0.025 g of t-butyl peroxide as a thermopolymerization initiator was injected into a cell produced in the same manner as in Example 2, thereby producing five kinds of liquid crystal cells. The liquid crystal cells were heated at a temperature of 130° C. for 4 hours to polymerize in the case of using the photopolymerizable materials. Similarly to Example 25, the photopolymerizable materials a and b, polymeric materials were found in a pixel, while in the case of using the photopolymerlzsble materials c, d, and e, polymeric materials were not found.

EXAMPLE 27

By using the same kinds of mixtures as those used in Example 25, five kinds of liquid crystal cells were produced. The resultant cells were heated up to a temperature of 90° C., and then annealed at a rate of −0.5° C./min. to a temperature that is 2° C. lower than the isotropic temperature of each mixture. While maintaining the temperature, the resultant cells were irradiated with UV rays by using a high pressure mercury lamp at 7 mW/cm² for 8 minutes, thereby polymerizing the photopolymerizable materials in the liquid crystal cells in the case of using the photopolymerizable materials a and b, a small amount of the polymeric materials were found in a pixel. In the case of using the photopolymerlzable materials c, d, and e, not only was no polymeric material found in the pixel but also the amount of the liquid crystal material trapped in the polymeric wall was decreased.

The liquid crystal display devices described in the above-mentioned examples have the following characteristics:

1. The liquid crystal molecules in the liquid crystal region are axisymmetrically oriented. Because of this orientation, the liquid crystal display devices have improved viewing angle characteristics. Specifically, such liquid crystal display devices are applicable to a plane display apparatus for wide viewing in a personal computer, a word processor, an amusement machine or a TV set, and a display board, a window, a door, a wall or the like using a shutter effect.

2. The liquid crystal molecules in the liquid crystal region on at least one substrate are oriented in one direction. By using the conventionally used alignment regulating force of the alignment film of the TN or STN liquid crystal display device, the liquid crystal molecules are oriented in one direction on one substrate. Thus, the display characteristics are prevented from degrading due to the variation in the cell gap caused by an external pressure. Owing to this strength against the external pressure, the liquid crystal display device of this invention is applicable to a display apparatus having a pen detective keyboard or a portable remote terminal.

As is apparent from the above description, the polymeric wall can be formed in a desired position, and the liquid crystal material can be more definitely phase-separated from the polymeric material in the present invention. Therefore, the liquid crystal display device can achieve higher contrast. Moreover, since less polymeric material enters a pixel, the response rate can be improved.

By providing a pair of polarizing plates, the liquid crystal cell is applicable to the conventional TN, STN, FLC (SSF) and ECB liquid crystal display devices, and the viewing angle characteristics and the contrast thereof are excellent.

The liquid crystal display device of this invention has a wide range of application such as a plane display apparatus for a projection TV, a personal computer or the like, and a display board, a window, a door, a wall or the like using a shutter effect. Further, a thin liquid crystal display device can be provided by using a thin substrate, a film substrate or the like.

In the present invention, the liquid crystal molecules are oriented in one pixel axisymmetrically with respect to the center of the pixel. Since the liquid crystal molecules are thus oriented omnidirectionally, the degradation in the contrast depending upon the viewing direction, which causes a problem in a conventional liquid crystal display device, can be avoided. In particular, the polymeric material is prevented from entering a pixel, the number of the liquid crystal domains in one pixel is decreased, and the liquid crystal molecules are oriented axisymmetrically so as to prevent the formation of a disclination line. In such a liquid crystal display device, not only the viewing angle characteristics but also the light transmittance under application of no voltage is improved.

Furthermore, in the production method for a liquid crystal display device of the present invention, surface free energy arrangement is first provided on the surface of a substrate, and by using a difference in the surface free energy between liquid crystal material and a polymerizable material to be used, a polymeric wall is formed in s certain pattern. The polymerization can be caused by any use of heat and light, and complicated positioning of a photomask or the like can be omitted.

In another embodiment of the liquid crystal display device of this invention, by selectively reforming the surface of an alignment film, the phase-separation between the liquid crystal material and the polymeric material is conducted and the positions thereof are controlled. The controlling method is also provided by this invention. The selective reform of the alignment film is conducted by using a level difference caused by an electrode or a pattern formed of a thin film such as a resist. This method is superior to the conventional methods such as a masking method, in which a photomask is fixed on the outside of a substrate, and an ITO self alignment method, in which ITO is used as a photomask for preventing the transmittance of UV rays. The superiority is in that there is no need to consider which material is to be used as the photomask and that the rubbing method, which has conventionally been used for producing a liquid crystal device, can be used to simplify the production procedure.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device comprising:
   a pair of substrates, at least one of which bears plural areas formed by using a uniform pattern of arrangement of surface free energy;
   a polymeric wall made of a polymeric material formed by polymerizing a polymerizable material, sandwiched between the substrates and formed in part of the plural areas having a first surface free energy; and
   a plurality of liquid crystal regions made of a liquid crystal material substantially surrounded by the polymeric wall, sandwiched between the substrates, and formed in another part of the plural areas having a second surface free energy;
   wherein positions of the areas having the first surface free energy, the areas having the second surface free energy, the polymeric wall and the liquid crystal region are determined so that the first surface free energy $\gamma_P$, the second surface free energy $\gamma_E$, surface free energy $\gamma_{LC}$ of the liquid crystal material and surface free energy $\gamma_M$ of the polymeric material satisfy the following relationship:

$$(\gamma_E - \gamma_P) \times (\gamma_{LC} - \gamma_M) > 0.$$

2. A liquid crystal display device according to claim 1, wherein the first surface free energy is smaller than the second free energy.

3. A liquid crystal display device according to claim 1, wherein a gap $d_1$ between the substrates in a pixel is larger than a gap $d_2$ between the substrates in at least part of a non-pixel position.

4. A liquid crystal display device according to claim 3, wherein the gaps $d_1$ and $d_2$ are determined so as to satisfy the following relationship:

$$0.1 \times d_1 < d_2 < 0.9 \times d_1.$$

5. A liquid crystal display device according to claim 3,
   wherein the liquid crystal display device is an active matrix display device,
   one of the substrates having an active element has a light shielded area in the non-pixel portion, and
   the other substrate has an area partially transmitting UV rays in at least part of the non-pixel portion.

6. A liquid crystal display device comprising:
   a pair of substrates opposing each other;
   a display medium being sandwiched between the substrates and including a polymeric wall made of a polymeric material and a plurality of liquid crystal regions surrounded by the polymeric wall; and
   a thin film formed in at least part of a non-pixel portion on a surface bearing the display medium of at least one of the substrates, the thin film being formed so as to make surface free energy $\gamma_P$ of the non-pixel portion smaller than surface free energy $\gamma_E$ of a pixel.
   wherein the surface free energy $\gamma_P$ of the thin film formed on the non-pixel portion, the surface free energy $\gamma_E$ of the pixel, surface free energy $\gamma_{LC}$ of the liquid crystal material and surface free energy $\gamma_M$ of the polymeric material satisfy the following relationship:

$$(\gamma_E - \gamma_P) \times (\gamma_{LC} - \gamma_M) > 0.$$

7. A liquid crystal display device according to claim 6, wherein each of at least 70% of the pixels has at least one of the liquid crystal regions having a size of 30% or more of that of the pixel.

8. A liquid crystal display device according to claim 6, wherein the surface free energy of the non-pixel portion is 29 mN/m to 75 mN/m.

9. A liquid crystal display device according to claim 6, wherein a difference in the surface free energy between the non-pixel portion and the pixel is 15 mN/m to 63.8 mN/m.

10. A method for producing a liquid crystal display device including a pair of substrates, at least one of which is transparent, and a complex film sandwiched between the substrates and having a space structure including a liquid crystal material and a polymeric material;
   wherein free energy of a system constituting the liquid crystal display device is spatially controlled for controlling the space structure during the production of the liquid crystal display device,
   interfacial free energy between at least one of the substrates facing the complex film and at least one component of the complex film is controlled for spatially controlling the free energy of the system, and
   a surface of the substrate is reformed for controlling the interfacial free energy.

11. A method for producing a liquid crystal display device including a pair of substrates, at least one of which is transparent, and a complex film sandwiched between the substrates and having a space structure including a liquid crystal material and a polymeric material;
   wherein free energy of a system constituting the liquid crystal display device is spatially controlled for controlling the space structure during the producing of the liquid crystal display device, and a distance between the substrates is controlled so that a surface area of a phase-separated interface between components of the complex film in a controlled regular state is smaller than the surface area of the phase-separated interface between components of the complex film in an irregular state, thereby controlling interfacial free energy on the phase-separated interface for spatially controlling the free energy of the system.

12. A method for producing a liquid crystal display device, wherein a mixture including at least liquid crystal material and a photopolymerizable material is injected between a pair of substrates and irradiated with UV rays so as to cause phase-separation accompanied with a polymerization reaction, thereby regularly arranging a polymeric material and the liquid crystal material, at least one of the substrates having a plurality of areas formed by using a regular surface free energy arrangement so that surface free energy of areas having smaller surface free energy is 29 mN/m to 75 mN/m.

13. A method for producing a liquid crystal display device according to claim 12, wherein the phase-separation between the liquid crystal material and the polymeric material is conducted while applying at least one of a voltage and a magnetic field.

14. A method for producing a liquid crystal display device according to claim 12, wherein the photopolymerizable material includes a polymerizable liquid crystal material.

15. A method for producing a liquid crystal device according to claim 12, wherein surface free energy of the photopolymerization material is 26 mN/m to 40 mN/m.

16. A method for producing a liquid crystal display device according to claim 12, wherein a liquid crystal cell fabricated by injecting the mixture including the liquid crystal material and the photopolymerizable material between the substrates is annealed from a temperature over an isotropic temperature $T_{iso}$ of the mixture of the liquid crystal material and the photopolymerizable material down to a temperature below the isotropic temperature $T_{iso}$.

17. A method for producing a liquid crystal display device, wherein a mixture including at least liquid crystal material and a photopolymerizable material is injected between a pair of substrates and irradiated with UV rays so as to cause phase-separation accompanied with a polymerization reaction, thereby regularly arranging a polymeric material and the liquid crystal material, at least one of the substrates having a plurality of areas formed by using a regular surface free energy arrangement having a difference in surface free energy of 15 mN/m to 63.8 mN/m.

18. A method for producing a liquid crystal display device according to claim 17, wherein the phase-separation between the liquid crystal material and the polymeric material is conducted while applying at least one of a voltage and a magnetic field.

19. A method for producing a liquid crystal display device according to claim 17, wherein the photopolymerizable material includes a polymerizable liquid crystal material.

20. A method for producing a liquid crystal display device according to claim 17, wherein surface free energy of the photopolymerizable material is 26 mN/m to 40 mN/m.

21. A method for producing a liquid crystal display device according to claim 17, wherein a liquid crystal cell fabricated by injecting the mixture including the liquid crystal material and the photopolymerizable material between the substrates is annealed from a temperature over an isotropic temperature $T_{iso}$ of the mixture of the liquid crystal material and the photopolymerizable material down to a temperature below the isotropic temperature $T_{iso}$.

22. A method for producing a liquid crystal display device having a pair of substrates opposing each other and a display medium sandwiched between the substrates and including a plurality of liquid crystal regions surrounded by a polymeric wall, the method comprising the steps of:

forming a thin film on at least part of a non-pixel portion of at least one of the substrates;

attaching the substrates to each other so as to have the thin film on an inner surface and have a gap therebetween;

injecting a mixture including at least liquid crystal material, a photopolymerizable material and a polymerization initiator into the gap; and irradiating the mixture with UV rays so as to form the display medium including the liquid crystal regions surrounded by the polymeric wall, wherein the step for forming the display medium includes phase-separation between the liquid crystal material and a polymeric material is conducted while applying at least one of a voltage and a magnetic field.

23. A method for producing a liquid crystal display device having a pair of substrates opposing each other and a display medium sandwiched between the substrates and including a plurality of liquid crystal regions surrounded by a polymeric wall, the method comprising the steps of:

forming a thin film on at least part of a non-pixel portion of at least one of the substrates;

attaching the substrates to each other so as to have the thin film on an inner surface and have a gap therebetween;

injecting a mixture including at least liquid crystal material, a photopolymerizable material and a polymerization initiator into the gap; and irradiating the mixture with UV rays so as to form the display medium including the liquid crystal regions surrounded by the polymeric wall, wherein surface free energy of the photopolymerizable material is 26 mN/m to 40 mN/m.

24. A method for producing a liquid crystal display device according to claim 23, wherein a portion of the mixture corresponding to a pixel is covered with a photomask in the step of irradiating the mixture with UV rays so that irradiation intensity on the portion covered with the photomask becomes 80% or less of intensity of irradiating UV rays.

25. A method for producing a liquid crystal display device according to claim 23, wherein the photopolymerizable material includes a polymerizable liquid crystal material.

26. A method for producing a liquid crystal display device, wherein a mixture including at least liquid crystal material and a thermopolymerizable material is injected between a pair of substrates and heated so as to cause phase-separation accompanied with a polymeric reaction, thereby regularly arranging a polymeric material and the liquid crystal material, at least one of the substrates having a plurality of areas formed by using surface free energy arrangement so that surface free energy of an area having a lower free energy is 29 mN/m to 75 mN/m.

27. A method for producing a liquid crystal display device according to claim 26, wherein the step for forming the display medium includes phase-separation between the liquid crystal material and a polymeric material is conducted while applying at least one of a voltage and a magnetic field.

28. A method for producing a liquid crystal display device according to claim 26, wherein the thermopolymerizable material includes a polymerizable liquid crystal material.

29. A method for producing a liquid crystal display device according to claim 26, wherein surface free energy of the thermopolymerizable material is 40 mN/m or less.

30. A method for producing a liquid crystal display device according to claim 26,
wherein a liquid crystal cell fabricated by injecting the mixture including the liquid crystal material and the thermopolymerizable material between the substrates is annealed from a temperature over an isotropic temperature $T_{iso}$ of the mixture of the liquid crystal material and the thermopolymerizable material down to a temperature below the isotropic temperature $T_{iso}$.

31. A method for producing a liquid crystal display device,
wherein a mixture including at least liquid crystal material and a thermopolymerizable material is injected between a pair of substrates and heated so as to cause phase-separation accompanied with a polymeric reaction, thereby regularly arranging a polymeric material and the liquid crystal material, at least one of the substrate having a plurality of areas formed by using surface free energy arrangement with a difference in surface free energy is 15 mN/m to 63.8 mN/m.

32. A method for producing a liquid crystal display device according to claim 31, wherein the step for forming the display medium includes phase-separation between the liquid crystal material and a polymeric material is conducted while applying at least one of a voltage and a magnetic field.

33. A method for producing a liquid crystal display device according to claim 31, wherein the thermopolymerizable material includes a polymerizable liquid crystal material.

34. A method for producing a liquid crystal display device according to claim 31, wherein surface free energy of the thermopolymerizable material is 40 mN/m or less.

35. A method for producing a liquid crystal display device according to claim 31,
wherein a liquid crystal cell fabricated by injecting the mixture including the liquid crystal material and the thermopolymerizable material between the substrates is annealed from a temperature over an isotropic temperature $T_{iso}$ of the mixture of the liquid crystal material and the thermopolymerizable material down to a temperature below the isotropic temperature $T_{iso}$.

36. A method for producing a liquid crystal display device including a pair of substrates bearing electrodes, at least one of which is transparent, and a complex film including liquid crystal material and a polymeric material sandwiched between the substrates,
wherein an alignment film is formed on an interface between one of the substrates and the complex film, and the alignment film is subjected to a rubbing treatment so that a surface of the alignment film is selectively reformed by using a difference in rubbing intensity due to a level difference caused by the electrodes.

37. A method for producing a liquid crystal display device including a pair of substrates bearing electrodes, at least one of which is transparent, and a complex film including liquid crystal material and a polymeric material sandwiched between the substrates,
wherein an alignment film is formed on an interface between one of the substrates and the complex film, and a coat is formed in a specified area on the alignment film.

38. A method for producing a liquid crystal display device including a pair of substrates bearing electrodes, at least one of which is transparent, and a complex film including liquid crystal material and a polymeric material sandwiched between the substrates, the method comprising the steps of:
forming an alignment film on the substrates bearing the electrodes;
forming a coat in a specified area on the alignment film; and
subjecting the alignment film and the coat to a rubbing treatment.

39. A liquid crystal display device comprising:
a pair of substrates opposing each other;
a display medium being sandwiched between the substrates and including a polymeric wall made of a polymeric material and a plurality of liquid crystal regions surrounded by the polymeric wall; and
a thin film formed in at least part of a non-pixel portion on a surface bearing the display medium of at least one of the substrates, the thin film being formed so as to make surface free energy $\gamma_P$ of the non-pixel portion smaller than surface free energy $\gamma_E$ of a pixel,
wherein the surface free energy of the non-pixel portion is 29 mN/m to 75 mN/m.

40. A liquid crystal display device according to claim 39, wherein each of at least 70% of the pixels has at least one of the liquid crystal regions having a size of 30% or more of the pixel.

41. A liquid crystal display device comprising:
a pair of substrates opposing each other;
a display medium being sandwiched between the substrates and including a polymeric wall made of a polymeric material and a plurality of liquid crystal regions surrounded by the polymeric wall; and
a thin film formed in at least part of a non-pixel portion on a surface bearing the display medium of at least one of the substrates, the thin film being formed so as to make surface free energy $\gamma_P$ of the non-pixel portion small than surface free energy $\gamma_E$ of a pixel,
wherein a difference in the surface free energy between the non-pixel portion and the pixel is 15 mN/m to 63.8 mN/m.

42. A liquid crystal display device according to claim 41, wherein each of at least 70% of the pixels has at least one of the liquid crystal regions having a size of 30% or more of the pixel.

\* \* \* \* \*